US012100408B2

(12) United States Patent
Xia et al.

(10) Patent No.: US 12,100,408 B2
(45) **Date of Patent: *Sep. 24, 2024**

(54) AUDIO CODING WITH TONAL COMPONENT SCREENING IN BANDWIDTH EXTENSION

(71) Applicant: Huawei Technologies Co., Ltd., Shenzhen (CN)

(72) Inventors: Bingyin Xia, Beijing (CN); Jiawei Li, Beijing (CN); Zhe Wang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 4 days.

This patent is subject to a terminal disclaimer.

(21) Appl. No.: 18/072,245

(22) Filed: Nov. 30, 2022

(65) Prior Publication Data

US 2023/0105508 A1 Apr. 6, 2023

Related U.S. Application Data

(63) Continuation of application No. PCT/CN2021/096687, filed on May 28, 2021.

(30) Foreign Application Priority Data

May 30, 2020 (CN) ......................... 202010480931.1

(51) Int. Cl.
*G10L 21/038* (2013.01)
*G10L 19/02* (2013.01)
*G10L 21/0316* (2013.01)

(52) U.S. Cl.
CPC .................................... *G10L 19/02* (2013.01)

(58) Field of Classification Search
CPC . G10L 19/02; G10L 19/0204; G10L 19/0208; G10L 19/028; G10L 21/038; G10L 21/0388; G10L 21/0316
(Continued)

(56) References Cited

U.S. PATENT DOCUMENTS 5,870,703 A * 2/1999 Oikawa .................. H04B 1/665 704/229
2003/0171917 A1* 9/2003 Zhu ......................... G10L 25/90 704/207
(Continued)

FOREIGN PATENT DOCUMENTS

CN 101896967 A 11/2010
CN 102750954 A 10/2012
(Continued)

OTHER PUBLICATIONS

Takamizawa et al., "An Efficient Tonal Component Coding Algorithm for MPEG-2 Audio NBC", 1997 IEEE International Conference on Acoustics, Speech, and Signal Processing, Apr. 21-24, 1997, pp. 331 to 334. (Year: 1997).*
(Continued)

*Primary Examiner* — Martin Lerner
(74) *Attorney, Agent, or Firm* — Conley Rose, P.C.

(57) ABSTRACT

An audio coding method includes obtaining a current frame of an audio signal, where the current frame includes a high frequency band signal; coding the high frequency band signal to obtain a coding parameter of the current frame, where coding includes tonal component screening, the coding parameter indicates information about a target tonal component of the high frequency band signal, the target tonal component is obtained after tonal component screening, and information about a tonal component includes location information, quantity information, and amplitude information or energy information of the tonal component; and performing bitstream multiplexing on the coding parameter to obtain a coded bitstream.

30 Claims, 8 Drawing Sheets

(58) Field of Classification Search
USPC ................................. 704/205, 206, 500, 501
See application file for complete search history.

(56) References Cited

U.S. PATENT DOCUMENTS

| | | | | |
|---|---|---|---|---|
| 2008/0270125 | A1 | 10/2008 | Choo et al. | |
| 2009/0177466 | A1* | 7/2009 | Rui | G10L 21/0208 704/225 |
| 2010/0250261 | A1 | 9/2010 | Laaksonen et al. | |
| 2010/0280833 | A1* | 11/2010 | Yamanashi | G10L 21/038 704/500 |
| 2013/0290003 | A1* | 10/2013 | Choo | G10L 19/02 704/500 |
| 2014/0343932 | A1* | 11/2014 | Daimou | G10L 19/26 704/205 |
| 2015/0162010 | A1 | 6/2015 | Ishikawa et al. | |
| 2015/0317997 | A1* | 11/2015 | Herberger | G10L 21/0208 386/285 |
| 2017/0069328 | A1 | 3/2017 | Kawashima et al. | |
| 2018/0182403 | A1 | 6/2018 | Kamano et al. | |
| 2018/0211676 | A1 | 7/2018 | Zernicki et al. | |
| 2020/0105284 | A1 | 4/2020 | Zernicki et al. | |
| 2022/0343926 | A1* | 10/2022 | Xia | G10L 19/0208 |
| 2022/0343927 | A1* | 10/2022 | Xia | G10L 19/02 |
| 2022/0358941 | A1* | 11/2022 | Xia | G10L 19/0204 |
| 2023/0040515 | A1* | 2/2023 | Xia | G10L 21/038 |
| 2023/0048893 | A1* | 2/2023 | Xia | G10L 19/22 |
| 2023/0105508 | A1* | 4/2023 | Xia | G10L 19/0204 704/500 |
| 2023/0137053 | A1* | 5/2023 | Xia | G10L 21/0388 704/500 |
| 2023/0138871 | A1* | 5/2023 | Xia | G10L 19/008 381/23 |
| 2023/0154473 | A1* | 5/2023 | Xia | G10L 21/038 704/500 |

FOREIGN PATENT DOCUMENTS

| | | | | |
|---|---|---|---|---|
| CN | 104584124 | A | 4/2015 | |
| CN | 106133831 | A | 11/2016 | |
| CN | 107924683 | A | 4/2018 | |
| EP | 2 830 065 | A1 * | 1/2015 | G10L 21/038 |
| EP | 2 980 792 | A1 * | 2/2016 | G10L 21/038 |
| EP | 3 288 031 | A1 * | 2/2018 | G10L 21/038 |
| EP | 3 471 094 | A1 * | 4/2019 | G10L 21/038 |
| JP | 2018106076 | A | 7/2018 | |
| WO | 2010066844 | A1 | 6/2010 | |

OTHER PUBLICATIONS

Samaali et al., "High-Frequency Tonal Components Restoration in Low-Bitrate Audio Coding Using Multiple Spectral Translations", 2015 23rd European Signal Processing Conference (EUSIPCO), Aug. 31 to Sep. 4, 2015, 5 Pages. (Year: 2015).*

Zernicki et al., "Improved Coding of Tonal Components in MPEG-4 AAC With SBR", 16th European Signal Processing Conference ( EUSIPCO), 235-28, Aug. 2008, 5 Pages. (Year: 2008).*

* cited by examiner

AUDIO CODING WITH TONAL COMPONENT SCREENING IN BANDWIDTH EXTENSION

CROSS-REFERENCE TO RELATED APPLICATIONS

This is a continuation of International Patent Application No. PCT/CN2021/096687 filed on May 28, 2021, which claims priority to Chinese Patent Application No. 202010480931.1 filed on May 30, 2020. The disclosures of the aforementioned applications are hereby incorporated by reference in their entireties.

TECHNICAL FIELD

This application relates to the field of audio signal coding technologies, and in particular, to an audio coding method and apparatus.

BACKGROUND

As quality of life improves, people have an increasing demand on high-quality audio. To better transmit an audio signal over limited bandwidth, the audio signal is encoded first, and then a coded bitstream is transmitted to a decoder side. The decoder side performs decoding processing on the received bitstream to obtain a decoded audio signal for playback.

How to improve audio signal coding quality becomes a technical problem that urgently needs to be resolved.

SUMMARY

Embodiments of this application provide an audio coding method and apparatus, to improve audio signal coding quality.

To resolve the foregoing technical problem, embodiments of this application provide the following technical solutions.

According to a first aspect, an embodiment of this application provides an audio coding method. The method includes obtaining a current frame of an audio signal, where the current frame includes a high frequency band signal; coding the high frequency band signal to obtain a coding parameter of the current frame, where coding includes tonal component screening, the coding parameter indicates information about a target tonal component of the high frequency band signal, the target tonal component is obtained after tonal component screening, and information about a tonal component includes location information, quantity information, and amplitude information or energy information of the tonal component; and performing bitstream multiplexing on the coding parameter to obtain a coded bitstream. In this embodiment of this application, the high frequency band signal is coded to obtain the coding parameter of the current frame, coding includes tonal component screening, the coding parameter indicates the target tonal component obtained after tonal component screening, bitstream multiplexing may be performed on the coding parameter to obtain the coded bitstream, and the information about the target tonal component that is carried in the coded bitstream and that is obtained in this embodiment of this application has undergone tonal component screening. Therefore, better tonal component coding effect can be efficiently obtained by using a limited quantity of coded bits, and audio signal coding quality can be improved.

In a possible implementation, a high frequency band corresponding to the high frequency band signal includes at least one frequency area, and the at least one frequency area includes a current frequency area. The coding the high frequency band signal to obtain a coding parameter of the current frame includes obtaining information about a candidate tonal component of the current frequency area based on a high frequency band signal of the current frequency area; performing tonal component screening on the information about the candidate tonal component of the current frequency area to obtain information about a target tonal component of the current frequency area; and obtaining a coding parameter of the current frequency area based on the information about the target tonal component of the current frequency area. In the foregoing solution, in this embodiment of this application, the coding process includes tonal component screening on the information about the candidate tonal component, the coding parameter indicates the target tonal component obtained after tonal component screening, bitstream multiplexing may be performed on the coding parameter to obtain the coded bitstream, and the information about the target tonal component that is carried in the coded bitstream and that is obtained in this embodiment of this application has undergone tonal component screening. Therefore, better tonal component coding effect can be efficiently obtained by using a limited quantity of coded bits, and audio signal coding quality can be improved.

In a possible implementation, a high frequency band corresponding to the high frequency band signal includes at least one frequency area, and the at least one frequency area includes a current frequency area. The coding the high frequency band signal to obtain a coding parameter of the current frame includes performing peak search based on a high frequency band signal of the current frequency area, to obtain information about a peak in the current frequency area, where the information about the peak in the current frequency area includes quantity information of the peak, location information of the peak, and energy information of the peak or amplitude information of the peak in the current frequency area; performing peak screening on the information about the peak in the current frequency area to obtain information about a candidate tonal component of the current frequency area; performing tonal component screening on the information about the candidate tonal component of the current frequency area to obtain information about a target tonal component of the current frequency area; and obtaining a coding parameter of the current frequency area based on the information about the target tonal component of the current frequency area. In the foregoing solution, the coding process includes peak screening on the information about the peak in the current frequency area and tonal component screening on the information about the candidate tonal component, the coding parameter indicates the target tonal component obtained after tonal component screening, bitstream multiplexing may be performed on the coding parameter to obtain the coded bitstream, and the information about the target tonal component that is carried in the coded bitstream and that is obtained in this embodiment of this application has undergone tonal component screening. Therefore, better tonal component coding effect can be efficiently obtained by using a limited quantity of coded bits, and audio signal coding quality can be improved.

In a possible implementation, the current frequency area includes at least one subband. The performing tonal component screening on the information about the candidate tonal component of the current frequency area to obtain information about a target tonal component of the current frequency area includes performing combination processing on candidate tonal components with a same subband sequence number in the current frequency area, to obtain information about a combination-processed candidate tonal component of the current frequency area; and obtaining the information about the target tonal component of the current frequency area based on the information about the combination-processed candidate tonal component of the current frequency area. In the foregoing solution, an audio coding apparatus may obtain subband sequence numbers corresponding to all candidate tonal components of the current frequency area, and perform combination processing on two or more candidate tonal components with a same subband sequence number in the current frequency area. The information about the combination-processed candidate tonal component is obtained by performing combination processing in the current frequency area. The information about the target tonal component that is carried in the coded bitstream and that is obtained in this embodiment of this application has undergone combination processing. Therefore, better tonal component coding effect can be efficiently obtained by using a limited quantity of coded bits, and audio signal coding quality can be improved.

In a possible implementation, the at least one subband includes a current subband. The information about the combination-processed candidate tonal component of the current frequency area includes: location information of a combination-processed candidate tonal component of the current subband, and amplitude information or energy information of the combination-processed candidate tonal component of the current subband; the location information of the combination-processed candidate tonal component of the current subband includes location information of one candidate tonal component in candidate tonal components of the current subband that do not undergo combination processing; and the amplitude information or the energy information of the combination-processed candidate tonal component of the current subband includes amplitude information or energy information of the one candidate tonal component, or the amplitude information or the energy information of the combination-processed candidate tonal component of the current subband is obtained through calculation based on amplitude information or energy information of the candidate tonal components of the current subband that do not undergo combination processing. In the foregoing solution, through combination processing, the information about the combination-processed candidate tonal component of the current subband may be obtained based on information about the candidate tonal components of the current subband.

In a possible implementation, the information about the combination-processed candidate tonal component of the current frequency area further includes quantity information of the combination-processed candidate tonal component of the current frequency area; and the quantity information of the combination-processed candidate tonal component of the current frequency area is the same as information about a quantity of subbands having a candidate tonal component in the current frequency area. In the foregoing solution, a subband having a candidate tonal component in the current frequency area is a subband that includes a candidate tonal component before combination processing and that is in the current frequency area. In this embodiment of this application, through combination processing, the information about the combination-processed candidate tonal component of the current frequency area may be obtained based on the information about the candidate tonal components of the current frequency area.

In a possible implementation, before the performing combination processing on candidate tonal components with a same subband sequence number in the current frequency area, the method further includes arranging, based on location information of candidate tonal components of the current frequency area, the candidate tonal components of the current frequency area in ascending or descending order of locations to obtain the location-arranged candidate tonal components of the current frequency area. The performing combination processing on candidate tonal components with a same subband sequence number in the current frequency area includes: performing combination processing on the candidate tonal components with the same subband sequence number in the current frequency area based on the location-arranged candidate tonal components of the current frequency area. In the foregoing solution, combination processing may be: arranging, based on the location information of the candidate tonal components of the current frequency area, the candidate tonal components in ascending or descending order of location information; for the candidate tonal components arranged in ascending or descending order of the location information, calculating subband sequence numbers corresponding to two candidate tonal components adjacent in location information; and if the subband sequence numbers corresponding to the two candidate tonal components in adjacent locations are the same, performing combination processing on the two candidate tonal components to obtain quantity information, location information, and energy information or amplitude information of a combined candidate tonal component of the current frequency area. In this embodiment of this application, the candidate tonal components of the current frequency area are arranged in ascending or descending order of locations, to obtain the location-arranged candidate tonal components of the current frequency area. Performing combination processing by using the location-arranged candidate tonal components of the current frequency area can improve combination processing efficiency.

In a possible implementation, the obtaining the information about the target tonal component of the current frequency area based on the information about the combination-processed candidate tonal component of the current frequency area includes obtaining the information about the target tonal component of the current frequency area based on the information about the combination-processed candidate tonal component of the current frequency area and information about a maximum quantity of codable tonal components of the current frequency area. In the foregoing solution, information about a quantity-screened candidate tonal component of the current frequency area is obtained by performing quantity screening based on the information about the combination-processed candidate tonal component and the information about the maximum quantity of codable tonal components of the current frequency area. In this case, the information about the quantity-screened candidate tonal component of the current frequency area is the information about the target tonal component of the current frequency area. In this embodiment of this application, the audio coding apparatus performs, based on the information about the maximum quantity of codable tonal components of the current frequency area, quantity screening processing on the information about the combination-processed candidate tonal component to obtain the information about the quantity-screened candidate tonal component of the current frequency area. Performing quantity screening processing can reduce a quantity of candidate tonal components of the current frequency area, and further improve audio signal coding efficiency.

In a possible implementation, the obtaining the information about the target tonal component of the current frequency area based on the information about the combination-processed candidate tonal component of the current frequency area and information about a maximum quantity of codable tonal components of the current frequency area includes arranging combination-processed candidate tonal components of the current frequency area based on energy information or amplitude information of the combination-processed candidate tonal components of the current frequency area, to obtain information about the candidate tonal components arranged based on the energy information or the amplitude information; and obtaining the information about the target tonal component of the current frequency area based on the information about the maximum quantity of codable tonal components of the current frequency area and the information about the candidate tonal components arranged based on the energy information or the amplitude information. In the foregoing solution, after the candidate tonal components are arranged in ascending or descending order of location information, quantity screening processing is performed on the information about the candidate tonal components arranged based on the energy information or the amplitude information. The information about the maximum quantity of codable tonal components of the current frequency area refers to a maximum quantity of tonal components of the current frequency area that are able to be used for coding. The information about the maximum quantity of codable tonal components of the current frequency area may be set to a preset second value, or may be obtained through selection based on a coding rate. The information about the quantity-screened candidate tonal component of the current frequency area may be obtained. Performing quantity screening processing can reduce a quantity of candidate tonal components of the current frequency area, and further improve audio signal coding efficiency.

In a possible implementation, the obtaining the information about the target tonal component of the current frequency area based on the information about the combination-processed candidate tonal component of the current frequency area includes: obtaining information about a quantity-screened candidate tonal component of the current frequency area based on the information about the combination-processed candidate tonal component of the current frequency area and information about a maximum quantity of codable tonal components of the current frequency area; and obtaining the information about the target tonal component of the current frequency area based on the information about the quantity-screened candidate tonal component of the current frequency area. In the foregoing solution, the audio coding apparatus performs, based on the information about the maximum quantity of codable tonal components of the current frequency area, quantity screening processing on the information about the combination-processed candidate tonal component to obtain the information about the quantity-screened candidate tonal component of the current frequency area. Performing quantity screening processing can reduce a quantity of candidate tonal components of the current frequency area, and further improve audio signal coding efficiency.

In a possible implementation, the obtaining information about a quantity-screened candidate tonal component of the current frequency area of the current frame based on the information about the combination-processed candidate tonal component of the current frequency area and information about a maximum quantity of codable tonal components of the current frequency area includes arranging combination-processed candidate tonal components of the current frequency area based on energy information or amplitude information of the combination-processed candidate tonal components of the current frequency area, to obtain information about the candidate tonal components arranged based on the energy information or the amplitude information; and obtaining the information about the quantity-screened candidate tonal components of the current frequency area of the current frame based on the information about the maximum quantity of codable tonal components of the current frequency area and the information about the candidate tonal components arranged based on the energy information or the amplitude information. In the foregoing solution, the audio coding apparatus may perform quantity screening processing on the information about the candidate tonal components arranged based on the energy information or the amplitude information, and further needs to obtain the information about the maximum quantity of codable tonal components of the current frequency area when performing quantity screening processing. The information about the maximum quantity of codable tonal components of the current frequency area refers to a maximum quantity of tonal components of the current frequency area that are able to be used for coding. The information about the maximum quantity of codable tonal components of the current frequency area may be set to a preset second value, or may be obtained through selection based on a coding rate.

In a possible implementation, the obtaining the information about the target tonal component of the current frequency area based on the information about the quantity-screened candidate tonal component of the current frequency area includes arranging, based on location information of quantity-screened candidate tonal components of the current frequency area of the current frame, the quantity-screened candidate tonal components of the current frequency area of the current frame in ascending or descending order of locations, to obtain the location-arranged quantity-screened candidate tonal components of the current frequency area of the current frame; obtaining, based on the location-arranged quantity-screened candidate tonal components of the current frequency area of the current frame, subband sequence numbers corresponding to the location-arranged quantity-screened candidate tonal components of the current frequency area of the current frame; obtaining subband sequence numbers corresponding to location-arranged quantity-screened candidate tonal components of a current frequency area of a previous frame of the current frame; and refining location information of a location-arranged quantity-screened $n^{th}$ candidate tonal component of the current frequency area of the current frame if the location information of the location-arranged quantity-screened $n^{th}$ candidate tonal component of the current frequency area of the current frame and location information of a location-arranged quantity-screened $n^{th}$ candidate tonal component of the current frequency area of the previous frame meet a preset condition, and a subband sequence number corresponding to the location-arranged quantity-screened $n^{th}$ candidate tonal component of the current frequency area of the current frame is different from a subband sequence number corresponding to the location-arranged quantity-screened $n^{th}$ candidate tonal component of the current frequency area of the previous frame, to obtain the information about the target tonal component of the current frequency area, where the $n^{th}$ candidate tonal component is any one of the location-arranged quantity-screened candidate tonal components of the current frequency area. In the foregoing solution, after performing inter-frame continuity refining processing, the audio coding apparatus may obtain the information about the target tonal component of the current frequency area. Continuity of tonal components between adjacent frames and subband distribution of tonal components are considered in inter-frame continuity refining processing. In this way, better tonal component coding effect is obtained by efficiently using a limited quantity of coded bits, and coding quality is improved.

In a possible implementation, the preset condition includes that a difference between the location information of the location-arranged quantity-screened $n^{th}$ candidate tonal component of the current frequency area of the current frame and the location information of the location-arranged quantity-screened $n^{th}$ candidate tonal component of the current frequency area of the previous frame is less than or equal to a preset threshold. In the foregoing solution, a value of the preset threshold is not limited. In this embodiment of this application, the preset condition is set in a plurality of implementations. The foregoing example is merely an optional solution. Another preset condition may be further set based on the foregoing preset condition. For example, a ratio of location information of an $n^{th}$ candidate tonal component of the current frequency area of the current frame to location information of an $n^{th}$ candidate tonal component of the current frequency area of the previous frame is less than or equal to another preset threshold, and a manner of setting another preset threshold is not limited.

In a possible implementation, the refining location information of a location-arranged quantity-screened $n^{th}$ candidate tonal component of the current frequency area of the current frame includes: refining the location information of the location-arranged quantity-screened $n^{th}$ candidate tonal component of the current frequency area of the current frame to the location information of the location-arranged quantity-screened $n^{th}$ candidate tonal component of the current frequency area of the previous frame. In the foregoing solution, the location information of the $n^{th}$ candidate tonal component of the current frequency area of the current frame is refined. Further, the location information of the $n^{th}$ candidate tonal component of the current frequency area of the current frame may be refined to be the same as that of the $n^{th}$ candidate tonal component of the current frequency area of the previous frame. The quantity information, the location information, and the amplitude information or the energy information of the target tonal component of the current frequency area is determined based on the quantity information, the location information, and the energy information or the amplitude information of the refined candidate tonal component. Continuity of tonal components between adjacent frames and subband distribution of tonal components are considered in inter-frame continuity refining processing. In this way, better tonal component coding effect is obtained by efficiently using a limited quantity of coded bits, and coding quality is improved.

In a possible implementation, the current frequency area includes at least one subband. The performing tonal component screening on the information about the candidate tonal component of the current frequency area to obtain information about a target tonal component of the current frequency area includes: performing combination processing on candidate tonal components with a same subband sequence number in the current frequency area to obtain the information about the target tonal component of the current frequency area. In the foregoing solution, the audio coding apparatus may obtain subband sequence numbers corresponding to all candidate tonal components of the current frequency area, and perform combination on the candidate tonal components with the same subband sequence number in the current frequency area. For example, two candidate tonal components of the current frequency area may be combined into one combination-processed candidate tonal component of the current frequency area if subband sequence numbers of the two candidate tonal components are the same. The information about the target tonal component of the current frequency area is obtained by performing combination processing in the current frequency area. The information about the target tonal component that is carried in the coded bitstream and that is obtained in this embodiment of this application has undergone combination processing. Therefore, better tonal component coding effect can be efficiently obtained by using a limited quantity of coded bits, and audio signal coding quality can be improved.

In a possible implementation, the current frequency area includes at least one subband. The performing tonal component screening on the information about the candidate tonal component of the current frequency area to obtain information about a target tonal component of the current frequency area includes: obtaining, based on location information of candidate tonal components of the current frequency area of the current frame, subband sequence numbers corresponding to the candidate tonal components of the current frequency area of the current frame; obtaining subband sequence numbers corresponding to candidate tonal components of a current frequency area of a previous frame of the current frame; and refining location information of an $n^{th}$ candidate tonal component of the current frequency area of the current frame if the location information of the $n^{th}$ candidate tonal component of the current frequency area of the current frame and location information of an $n^{th}$ candidate tonal component of the current frequency area of the previous frame meet a preset condition, and a subband sequence number corresponding to the $n^{th}$ candidate tonal component of the current frequency area of the current frame is different from a subband sequence number corresponding to the $n^{th}$ candidate tonal component of the current frequency area of the previous frame, to obtain the information about the target tonal component of the current frequency area, where the $n^{th}$ candidate tonal component is any one of the candidate tonal components of the current frequency area. In the foregoing solution, continuity of tonal components between adjacent frames and subband distribution of tonal components are considered in inter-frame continuity refining processing. In this way, better tonal component coding effect is obtained by efficiently using a limited quantity of coded bits, and coding quality is improved.

In a possible implementation, the obtaining, based on location information of candidate tonal components of the current frequency area of the current frame, subband sequence numbers corresponding to the candidate tonal components of the current frequency area of the current frame includes: arranging, based on the location information of the candidate tonal components of the current frequency area of the current frame, the candidate tonal components of the current frequency area of the current frame in ascending or descending order of locations, to obtain the location-arranged candidate tonal components of the current frequency area of the current frame; and obtaining, based on the location-arranged candidate tonal components of the current frequency area, subband sequence numbers corresponding to the candidate tonal components of the current frequency area of the current frame. In the foregoing solution, the candidate tonal components of the current frequency area are arranged in ascending or descending order of locations, to obtain the location-arranged candidate tonal components of the current frequency area. Performing inter-frame continuity refining processing by using the location-arranged candidate tonal components of the current frequency area can improve inter-frame continuity refining processing efficiency.

In a possible implementation, the preset condition includes that a difference between the location information of the $n^{th}$ candidate tonal component of the current frequency area of the current frame and the location information of the $n^{th}$ candidate tonal component of the current frequency area of the previous frame is less than or equal to a preset threshold. In the foregoing solution, a value of the preset threshold is not limited. In this embodiment of this application, the preset condition is set in a plurality of implementations. The foregoing example is merely an optional solution. Another preset condition may be further set based on the foregoing preset condition. For example, a ratio of location information of an $n^{th}$ candidate tonal component of the current frequency area of the current frame to location information of an $n^{th}$ candidate tonal component of the current frequency area of the previous frame is less than or equal to another preset threshold, and a manner of setting another preset threshold is not limited.

In a possible implementation, the refining location information of an $n^{th}$ candidate tonal component of the current frequency area of the current frame includes refining the location information of the $n^{th}$ candidate tonal component of the current frequency area of the current frame to the location information of the $n^{th}$ candidate tonal component of the current frequency area of the previous frame. In the foregoing solution, the location information of the $n^{th}$ candidate tonal component of the current frame of the frequency area is refined. Further, the location information of the $n^{th}$ candidate tonal component of the current frequency area of the current frame may be refined to be the same as that of the $n^{th}$ candidate tonal component of the current frequency area of the previous frame. The quantity information, the location information, and the amplitude information or the energy information of the target tonal component of the current frequency area is determined based on the quantity information, the location information, and the energy information or the amplitude information of the refined candidate tonal component. Continuity of tonal components between adjacent frames and subband distribution of tonal components are considered in inter-frame continuity refining processing. In this way, better tonal component coding effect is obtained by efficiently using a limited quantity of coded bits, and coding quality is improved.

In a possible implementation, the performing tonal component screening on the information about the candidate tonal component of the current frequency area to obtain information about a target tonal component of the current frequency area includes obtaining the information about the target tonal component of the current frequency area based on information about candidate tonal components of the current frequency area and information about a maximum quantity of codable tonal components of the current frequency area. In the foregoing solution, the audio coding apparatus performs, based on the information about the maximum quantity of codable tonal components of the current frequency area, quantity screening processing on the information about the combination-processed candidate tonal component to obtain the information about the quantity-screened candidate tonal component of the current frequency area. Performing quantity screening processing can reduce a quantity of candidate tonal components of the current frequency area, and further improve audio signal coding efficiency.

In a possible implementation, obtaining the information about the target tonal component of the current frequency area based on information about candidate tonal components of the current frequency area and information about a maximum quantity of codable tonal components of the current frequency area includes selecting, based on the information about the maximum quantity of codable tonal components of the current frequency area, X candidate tonal components with maximum energy information or maximum amplitude information among the candidate tonal components of the current frequency area, where X is less than or equal to the maximum quantity of codable tonal components of the current frequency area, and X is a positive integer; and determining information about the X candidate tonal components as the information about the target tonal component of the current frequency area, where X represents a quantity of target tonal components of the current frequency area. In the foregoing solution, the audio coding apparatus may directly use the information about the X candidate tonal components as the information about the target tonal component of the current frequency area, where X represents the quantity of target tonal components of the current frequency area. Alternatively, the information about the target tonal component of the current frequency area is further determined based on the information about the X candidate tonal components. For example, inter-frame continuity refining processing is performed on the information about the X candidate tonal components, and corrected information about the X candidate tonal components is used as the information about the target tonal component of the current frequency area. Alternatively, weighted adjustment is performed on energy information or amplitude information of the X candidate tonal components, and weighted-adjusted information of the X candidate tonal components is used as the information about the target tonal component of the current frequency area.

In a possible implementation, the information about the candidate tonal component includes amplitude information or energy information of the candidate tonal component, and the amplitude information or the energy information of the candidate tonal component includes a power spectrum ratio of the candidate tonal component, where the power spectrum ratio of the candidate tonal component is a ratio of a power spectrum of the candidate tonal component to a mean value of power spectrums of the current frequency area.

According to a second aspect, an embodiment of this application further provides an audio coding apparatus. The apparatus includes an obtaining module configured to obtain a current frame of an audio signal, where the current frame includes a high frequency band signal; a coding module configured to code the high frequency band signal to obtain a coding parameter of the current frame, where coding includes tonal component screening, the coding parameter indicates information about a target tonal component of the high frequency band signal, the target tonal component is obtained after tonal component screening, and information about a tonal component includes location information, quantity information, and amplitude information or energy information of the tonal component; and a bitstream multiplexing module, configured to perform bitstream multiplexing on the coding parameter to obtain a coded bitstream. In this embodiment of this application, the high frequency band signal is coded to obtain the coding parameter of the current frame, coding includes tonal component screening, the coding parameter indicates the target tonal component obtained after tonal component screening, bitstream multiplexing may be performed on the coding parameter to obtain the coded bitstream, and the information about the target tonal component that is carried in the coded bitstream and that is obtained in this embodiment of this application has undergone tonal component screening. Therefore, better tonal component coding effect can be efficiently obtained by using a limited quantity of coded bits, and audio signal coding quality can be improved.

In a possible implementation, a high frequency band corresponding to the high frequency band signal includes at least one frequency area, and the at least one frequency area includes a current frequency area. The coding module is configured to obtain information about a candidate tonal component of the current frequency area based on a high frequency band signal of the current frequency area; perform tonal component screening on the information about the candidate tonal component of the current frequency area to obtain information about a target tonal component of the current frequency area; and obtain a coding parameter of the current frequency area based on the information about the target tonal component of the current frequency area.

In a possible implementation, a high frequency band corresponding to the high frequency band signal includes at least one frequency area, and the at least one frequency area includes a current frequency area. The coding module is configured to perform peak search based on a high frequency band signal of the current frequency area, to obtain information about a peak in the current frequency area, where the information about the peak in the current frequency area includes quantity information of the peak, location information of the peak, and energy information of the peak or amplitude information of the peak in the current frequency area; perform peak screening on the information about the peak in the current frequency area to obtain information about a candidate tonal component of the current frequency area; perform tonal component screening on the information about the candidate tonal component of the current frequency area to obtain information about a target tonal component of the current frequency area; and obtain a coding parameter of the current frequency area based on the information about the target tonal component of the current frequency area.

In a possible implementation, the current frequency area includes at least one subband. The coding module is configured to perform combination processing on candidate tonal components with a same subband sequence number in the current frequency area, to obtain information about a combination-processed candidate tonal component of the current frequency area; and obtain the information about the target tonal component of the current frequency area based on the information about the combination-processed candidate tonal component of the current frequency area.

In a possible implementation, the at least one subband includes a current subband. The information about the combination-processed candidate tonal component of the current frequency area includes location information of a combination-processed candidate tonal component of the current subband, and amplitude information or energy information of the combination-processed candidate tonal component of the current subband; the location information of the combination-processed candidate tonal component of the current subband includes location information of one candidate tonal component in candidate tonal components of the current subband that do not undergo combination processing; and the amplitude information or the energy information of the combination-processed candidate tonal component of the current subband includes amplitude information or energy information of the one candidate tonal component, or the amplitude information or the energy information of the combination-processed candidate tonal component of the current subband is obtained through calculation based on amplitude information or energy information of the candidate tonal components of the current subband that do not undergo combination processing.

In a possible implementation, the information about the combination-processed candidate tonal component of the current frequency area further includes quantity information of the combination-processed candidate tonal component of the current frequency area; and the quantity information of the combination-processed candidate tonal component of the current frequency area is the same as information about a quantity of subbands having a candidate tonal component in the current frequency area.

In a possible implementation, the coding module is configured to: before performing combination processing on the candidate tonal components with the same subband sequence number in the current frequency area, arrange, based on location information of candidate tonal components of the current frequency area, the candidate tonal components of the current frequency area in ascending or descending order of locations to obtain the location-arranged candidate tonal components of the current frequency area. The coding module is configured to perform combination processing on the candidate tonal components with the same subband sequence number in the current frequency area based on the location-arranged candidate tonal components of the current frequency area.

In a possible implementation, the coding module is configured to obtain the information about the target tonal component of the current frequency area based on the information about the combination-processed candidate tonal component of the current frequency area and information about a maximum quantity of codable tonal components of the current frequency area.

In a possible implementation, the coding module is configured to arrange combination-processed candidate tonal components of the current frequency area based on energy information or amplitude information of the combination-processed candidate tonal components of the current frequency area, to obtain information about the candidate tonal components arranged based on the energy information or the amplitude information; and obtain the information about the target tonal component of the current frequency area based on the information about the maximum quantity of codable tonal components of the current frequency area and the information about the candidate tonal components arranged based on the energy information or the amplitude information.

In a possible implementation, the coding module is configured to obtain information about a quantity-screened candidate tonal component of the current frequency area based on the information about the combination-processed candidate tonal component of the current frequency area and information about a maximum quantity of codable tonal components of the current frequency area; and obtain the information about the target tonal component of the current frequency area based on the information about the quantity-screened candidate tonal component of the current frequency area.

In a possible implementation, the coding module is configured to arrange combination-processed candidate tonal components of the current frequency area based on energy information or amplitude information of the combination-processed candidate tonal components of the current frequency area, to obtain information about the candidate tonal components arranged based on the energy information or the amplitude information; and obtain the information about the quantity-screened candidate tonal components of the current frequency area of the current frame based on the information about the maximum quantity of codable tonal components of the current frequency area and the information about the candidate tonal components arranged based on the energy information or the amplitude information.

In a possible implementation, the coding module is configured to arrange, based on location information of quantity-screened candidate tonal components of the current frequency area of the current frame, the quantity-screened candidate tonal components of the current frequency area of the current frame in ascending or descending order of locations, to obtain the location-arranged quantity-screened candidate tonal components of the current frequency area of the current frame; obtain, based on the location-arranged quantity-screened candidate tonal components of the current frequency area of the current frame, subband sequence numbers corresponding to the location-arranged quantity-screened candidate tonal components of the current frequency area of the current frame; obtain subband sequence numbers corresponding to location-arranged quantity-screened candidate tonal components of a current frequency area of a previous frame of the current frame; and refine location information of a location-arranged quantity-screened $n^{th}$ candidate tonal component of the current frequency area of the current frame if the location information of the location-arranged quantity-screened $n^{th}$ candidate tonal component of the current frequency area of the current frame and location information of a location-arranged quantity-screened $n^{th}$ candidate tonal component of the current frequency area of the previous frame meet a preset condition, and a subband sequence number corresponding to the location-arranged quantity-screened $n^{th}$ candidate tonal component of the current frequency area of the current frame is different from a subband sequence number corresponding to the location-arranged quantity-screened $n^{th}$ candidate tonal component of the current frequency area of the previous frame, to obtain the information about the target tonal component of the current frequency area, where the $n^{th}$ candidate tonal component is any one of the location-arranged quantity-screened candidate tonal components of the current frequency area.

In a possible implementation, the preset condition includes that a difference between the location information of the location-arranged quantity-screened $n^{th}$ candidate tonal component of the current frequency area of the current frame and the location information of the location-arranged quantity-screened $n^{th}$ candidate tonal component of the current frequency area of the previous frame is less than or equal to a preset threshold.

In a possible implementation, the coding module is configured to refine the location information of the location-arranged quantity-screened $n^{th}$ candidate tonal component of the current frequency area of the current frame to the location information of the location-arranged quantity-screened $n^{th}$ candidate tonal component of the current frequency area of the previous frame.

In a possible implementation, the current frequency area includes at least one subband. The coding module is configured to perform combination processing on candidate tonal components with a same subband sequence number in the current frequency area to obtain the information about the target tonal component of the current frequency area.

In a possible implementation, the current frequency area includes at least one subband. The coding module is configured to obtain, based on location information of candidate tonal components of the current frequency area of the current frame, subband sequence numbers corresponding to the candidate tonal components of the current frequency area of the current frame; obtain subband sequence numbers corresponding to candidate tonal components of a current frequency area of a previous frame of the current frame; and refine location information of an $n^{th}$ candidate tonal component of the current frequency area of the current frame if the location information of the $n^{th}$ candidate tonal component of the current frequency area of the current frame and location information of an $n^{th}$ candidate tonal component of the current frequency area of the previous frame meet a preset condition, and a subband sequence number corresponding to the $n^{th}$ candidate tonal component of the current frequency area of the current frame is different from a subband sequence number corresponding to the $n^{th}$ candidate tonal component of the current frequency area of the previous frame, to obtain the information about the target tonal component of the current frequency area, where the $n^{th}$ candidate tonal component is any one of the candidate tonal components of the current frequency area.

In a possible implementation, the coding module is configured to arrange, based on the location information of the candidate tonal components of the current frequency area of the current frame, the candidate tonal components of the current frequency area of the current frame in ascending or descending order of locations, to obtain the location-arranged candidate tonal components of the current frequency area of the current frame; and obtain, based on the location-arranged candidate tonal components of the current frequency area, subband sequence numbers corresponding to the candidate tonal components of the current frequency area of the current frame.

In a possible implementation, the preset condition includes that a difference between the location information of the $n^{th}$ candidate tonal component of the current frequency area of the current frame and the location information of the $n^{th}$ candidate tonal component of the current frequency area of the previous frame is less than or equal to a preset threshold.

In a possible implementation, the coding module is configured to refine the location information of the $n^{th}$ candidate tonal component of the current frequency area of the current frame to the location information of the $n^{th}$ candidate tonal component of the current frequency area of the previous frame.

In a possible implementation, the coding module is configured to obtain the information about the target tonal component of the current frequency area based on information about candidate tonal components of the current frequency area and information about a maximum quantity of codable tonal components of the current frequency area.

In a possible implementation, the coding module is configured to select, based on the information about the maximum quantity of codable tonal components of the current frequency area, X candidate tonal components with maximum energy information or maximum amplitude information among the candidate tonal components of the current frequency area, where X is less than or equal to the maximum quantity of codable tonal components of the current frequency area, and X is a positive integer; and determine information about the X candidate tonal components as the information about the target tonal component of the current frequency area, where X represents a quantity of target tonal components of the current frequency area.

In a possible implementation, the information about the candidate tonal component includes amplitude information or energy information of the candidate tonal component, and the amplitude information or the energy information of the candidate tonal component includes a power spectrum ratio of the candidate tonal component, where the power spectrum ratio of the candidate tonal component is a ratio of a power spectrum of the candidate tonal component to a mean value of power spectrums of the current frequency area.

In the second aspect of this application, the modules of the audio coding apparatus may further perform steps described in the first aspect and the possible implementations. For details, refer to the foregoing descriptions in the first aspect and the possible implementations.

According to a third aspect, an embodiment of this application provides an audio coding apparatus including a non-volatile memory and a processor coupled to each other. The processor invokes program code stored in the memory to perform the method according to any one of the first aspect.

According to a fourth aspect, an embodiment of this application provides an audio coding apparatus including an encoder. The encoder is configured to perform the method according to any one of the first aspect.

According to a fifth aspect, an embodiment of this application provides a computer-readable storage medium including a computer program. When the computer program is executed on a computer, the computer is enabled to perform the method according to any one of the first aspect.

According to a sixth aspect, an embodiment of this application provides a computer-readable storage medium including the coded bitstream obtained by using the method according to any one of the first aspect.

According to a seventh aspect, this application provides a computer program product. The computer program product includes a computer program. When the computer program is executed by a computer, the method according to any one of the first aspect is performed.

According to an eighth aspect, this application provides a chip, including a processor and a memory. The memory is configured to store a computer program and the processor is configured to invoke and run the computer program stored in the memory, to perform the method according to any one of the first aspect.

DESCRIPTION OF EMBODIMENTS

Embodiments of this application provide an audio coding method and apparatus, to improve audio signal coding quality.

The following describes embodiments of this application with reference to accompanying drawings.

In the specification, claims, and accompanying drawings of this application, terms "first", "second", and the like are intended to distinguish between similar objects, but do not necessarily indicate a specific order or sequence. It should be understood that the terms used in such a way are interchangeable in proper circumstances, which is merely a discrimination manner that is used when objects having a same attribute are described in embodiments of this application. In addition, terms "include", "comprise" and any other variants thereof mean to cover the non-exclusive inclusion, so that a process, method, system, product, or device that includes a series of units is not necessarily limited to those units, but may include other units not expressly listed or inherent to such a process, method, product, or device.

It should be understood that in this application, "at least one piece (item)" refers to one or more, and "a plurality of" refers to two or more. The term "and/or" is used for describing an association relationship between associated objects, and represents that three relationships may exist. For example, "A and/or B" may represent the following three cases: Only A exists, only B exists, and both A and B exist, where A and B may be singular or plural. The character "/" generally indicates an "or" relationship between the associated objects. "At least one of the following items (pieces)" or a similar expression thereof refers to any combination of these items, including any combination of singular items (pieces) or plural items (pieces). For example, at least one of a, b, or c may represent: a, b, c, "a and b", "a and c", "b and c", or "a, b and c". Each of a, b, and c may be singular or plural. Alternatively, some of a, b, and c may be singular; and some of a, b, and c may be plural.

Figure 1:
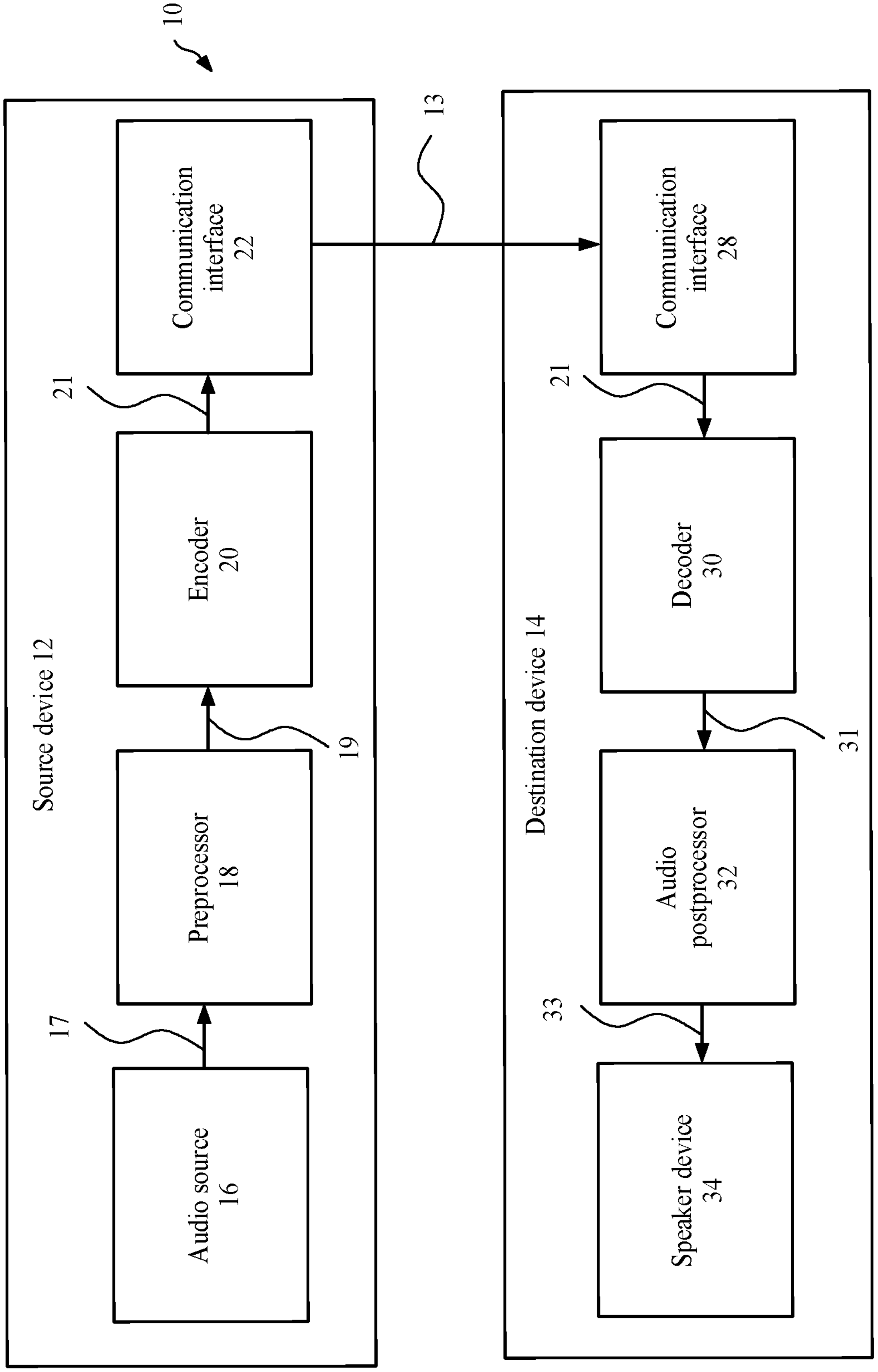
FIG. 1 is a schematic diagram of an example of an audio encoding and decoding system according to an embodiment of this application.

The following describes a system architecture to which an embodiment of this application is applied. FIG. 1 shows a schematic block diagram of an example of an audio encoding and decoding system 10 to which an embodiment of this application is applied. As shown in FIG. 1, the audio encoding and decoding system 10 may include a source device 12 and a destination device 14. The source device 12 generates encoded audio data. Therefore, the source device 12 may be referred to as an audio coding apparatus. The destination device 14 can decode the encoded audio data generated by the source device 12. Therefore, the destination device 14 may be referred to as an audio decoding apparatus. In various implementation solutions, the source device 12, the destination device 14, or both the source device 12 and the destination device 14 may include one or more processors and a memory coupled to the one or more processors. The memory may include but is not limited to a random-access memory (RAM), a read-only memory (ROM), an electrically erasable programmable ROM (EEPROM), a flash memory, or any other medium that can be used to store desired program code in a form of an instruction or a data structure that can be accessed by a computer, as described in this specification. The source device 12 and the destination device 14 may include various apparatuses including a desktop computer, a mobile computing apparatus, a notebook (for example, a laptop) computer, a tablet computer, a set-top box, a telephone handset such as a "smart" phone, a television, a sound box, a digital media player, a video game console, an in-vehicle computer, a wireless communication device, or the like.

Although FIG. 1 depicts the source device 12 and the destination device 14 as separate devices, a device embodiment may alternatively include both the source device 12 and the destination device 14 or functionalities of both the source device 12 and the destination device 14, that is, the source device 12 or a corresponding functionality and the destination device 14 or a corresponding functionality. In these embodiments, the source device 12 or the corresponding functionality and the destination device 14 or the corresponding functionality may be implemented by using same hardware and/or software, separate hardware and/or software, or any combination thereof.

A communication connection between the source device 12 and the destination device 14 may be implemented over a link 13, and the destination device 14 may receive encoded audio data from the source device 12 over the link 13. The link 13 may include one or more media or apparatuses capable of moving the encoded audio data from the source device 12 to the destination device 14. In an example, the link 13 may include one or more communication media that enable the source device 12 to directly transmit the encoded audio data to the destination device 14 in real time. In this example, the source device 12 can modulate the encoded audio data according to a communication standard (for example, a wireless communication protocol), and can transmit modulated audio data to the destination device 14. The one or more communication media may include a wireless communication medium and/or a wired communication medium, for example, a radio frequency (RF) spectrum or one or more physical transmission lines. The one or more communication media may form a part of a packet-based network, and the packet-based network is, for example, a local area network, a wide area network, or a global network (for example, the internet). The one or more communication media may include a router, a switch, a base station, or another device that facilitates communication from the source device 12 to the destination device 14.

The source device 12 includes an encoder 20. Optionally, the source device 12 may further include an audio source 16, a preprocessor 18, and a communication interface 22. In a specific implementation, the encoder 20, the audio source 16, the preprocessor 18, and the communication interface 22 may be hardware components in the source device 12, or may be software programs in the source device 12. They are separately described as follows.

The audio source 16 may include or may be a sound capture device of any type, configured to capture, for example, sound from the real world, and/or an audio generation device of any type. The audio source 16 may be a microphone configured to capture sound or a memory configured to store audio data, and the audio source 16 may further include any type of (internal or external) interface for storing previously captured or generated audio data and/or for obtaining or receiving audio data. When the audio source 16 is a microphone, the audio source 16 may be, for example, a local microphone or a microphone integrated into the source device. When the audio source 16 is a memory, the audio source 16 may be, for example, a local memory or a memory integrated into the source device. When the audio source 16 includes an interface, the interface may be, for example, an external interface for receiving audio data from an external audio source. For example, the external audio source is an external sound capture device such as a microphone, an external storage, or an external audio generation device. The interface may be any type of interface, for example, a wired or wireless interface or an optical interface, according to any proprietary or standardized interface protocol.

In this embodiment of this application, the audio data transmitted from the audio source 16 to the preprocessor 18 may also be referred to as raw audio data 17.

The preprocessor 18 is configured to receive and preprocess the raw audio data 17, to obtain preprocessed audio 19 or preprocessed audio data 19. For example, preprocessing performed by the preprocessor 18 may include filtering or denoising.

The encoder 20 (or referred to as an audio encoder 20) is configured to receive the preprocessed audio data 19, and is configured to perform the embodiments described below, to implement application of the audio coding method described in this application on an encoder side.

The communication interface 22 may be configured to receive encoded audio data 21, and transmit the encoded audio data 21 to the destination device 14 or any other device (for example, a memory) over the link 13 for storage or direct reconstruction. The other device may be any device used for decoding or storage. The communication interface 22 may be, for example, configured to encapsulate the encoded audio data 21 into an appropriate format, for example, a data packet, for transmission over the link 13.

The destination device 14 includes a decoder 30. Optionally, the destination device 14 may further include a communication interface 28, an audio postprocessor 32, and a speaker device 34. They are separately described as follows.

The communication interface 28 may be configured to receive the encoded audio data 21 from the source device 12 or any other source. The any other source is, for example, a storage device. The storage device is, for example, a device for storing the encoded audio data. The communication interface 28 may be configured to transmit or receive the encoded audio data 21 over the link 13 between the source device 12 and the destination device 14 or through any type of network. The link 13 is, for example, a direct wired or wireless connection. The any type of network is, for example, a wired or wireless network or any combination thereof, or any type of private or public network, or any combination thereof. The communication interface 28 may be, for example, configured to decapsulate the data packet transmitted through the communication interface 22, to obtain the encoded audio data 21.

Both the communication interface 28 and the communication interface 22 may be configured as unidirectional communication interfaces or bidirectional communication interfaces, and may be configured to, for example, send and receive messages to establish a connection, and acknowledge and exchange any other information related to a communication link and/or data transmission such as encoded audio data transmission.

The decoder 30 (or referred to as an audio decoder 30) is configured to receive the encoded audio data 21 and provide decoded audio data 31 or decoded audio 31. In some embodiments, the decoder 30 may be configured to perform the embodiments described below, to implement application of the audio coding method described in this application on a decoder side.

The audio postprocessor 32 is configured to postprocess the decoded audio data 31 (also referred to as reconstructed audio data) to obtain postprocessed audio data 33. Postprocessing performed by the audio postprocessor 32 may include, for example, rendering or any other processing, and may be further configured to transmit the postprocessed audio data 33 to the speaker device 34.

The speaker device 34 is configured to receive the postprocessed audio data 33 to play audio to, for example, a user or a viewer. The speaker device 34 may be or may include any type of loudspeaker configured to play reconstructed sound.

Although FIG. 1 depicts the source device 12 and the destination device 14 as separate devices, a device embodiment may alternatively include both the source device 12 and the destination device 14 or functionalities of both the source device 12 and the destination device 14, that is, the source device 12 or a corresponding functionality and the destination device 14 or a corresponding functionality. In these embodiments, the source device 12 or the corresponding functionality and the destination device 14 or the corresponding functionality may be implemented by using same hardware and/or software, separate hardware and/or software, or any combination thereof.

As will be apparent for a person skilled in the art based on the descriptions, existence and (exact) split of functionalities of the different units or functionalities of the source device 12 and/or the destination device 14 shown in FIG. 1 may vary depend on an actual device and application. The source device 12 and the destination device 14 may include any one of a wide range of devices, including any type of handheld or stationary device, for example, a notebook or laptop computer, a mobile phone, a smartphone, a pad or a tablet computer, a video camera, a desktop computer, a set-top box, a television, a camera, an in-vehicle device, a sound box, a digital media player, an audio game console, an audio streaming transmission device (such as a content service server or a content distribution server), a broadcast receiver device, a broadcast transmitter device, smart glasses, or a smart watch, and may not use or may use any type of operating system.

The encoder 20 and the decoder 30 each may be implemented as any one of various appropriate circuits, for example, one or more microprocessors, digital signal processors (DSPs), application-specific integrated circuits (ASICs), field-programmable gate arrays (FPGAs), discrete logic, hardware, or any combinations thereof. If the technologies are implemented partially by using software, a device may store software instructions in an appropriate and non-transitory computer-readable storage medium and may execute the instructions by using hardware such as one or more processors, to perform the technologies of this disclosure. Any one of the foregoing content (including hardware, software, a combination of hardware and software, and the like) may be considered as one or more processors.

In some cases, the audio encoding and decoding system 10 shown in FIG. 1 is merely an example, and the technologies of this application are applicable to audio coding settings (for example, audio encoding or audio decoding) that do not necessarily include any data communication between an encoding device and a decoding device. In another example, data may be retrieved from a local memory, transmitted in a streaming manner through a network, or the like. An audio coding device may encode data and store data into the memory, and/or an audio decoding device may retrieve and decode the data from the memory. In some examples, encoding and decoding are performed by devices that do not communicate with one another, but simply encode data to the memory and/or retrieve and decode data from the memory.

The encoder may be a multi-channel encoder, for example, a stereo encoder, a 5.1-channel encoder, or a 7.1-channel encoder. Certainly, it may be understood that the foregoing encoder may also be a mono encoder.

The audio data may also be referred to as an audio signal. The audio signal in this embodiment of this application is an input signal in an audio coding device. The audio signal may include a plurality of frames. For example, a current frame may further refer to a frame in the audio signal. In embodiments of this application, audio signal encoding and decoding of a current frame are used as an example for description. A previous frame or a next frame of the current frame in the audio signal may be correspondingly encoded and decoded based on an audio signal encoding and decoding manner of the current frame. Encoding and decoding processes of the previous frame or the next frame of the current frame in the audio signal are not described one by one. In addition, the audio signal in embodiments of this application may be a mono audio signal, or may be a multi-channel signal, for example, a stereo signal. The stereo signal may be a raw stereo signal, may be a stereo signal including two channels of signals (a left channel signal and a right channel signal) included in a multi-channel signal, or may be a stereo signal including two channels of signals generated by at least three channels of signals included in a multi-channel signal. This is not limited in embodiments of this application.

Figure 2:
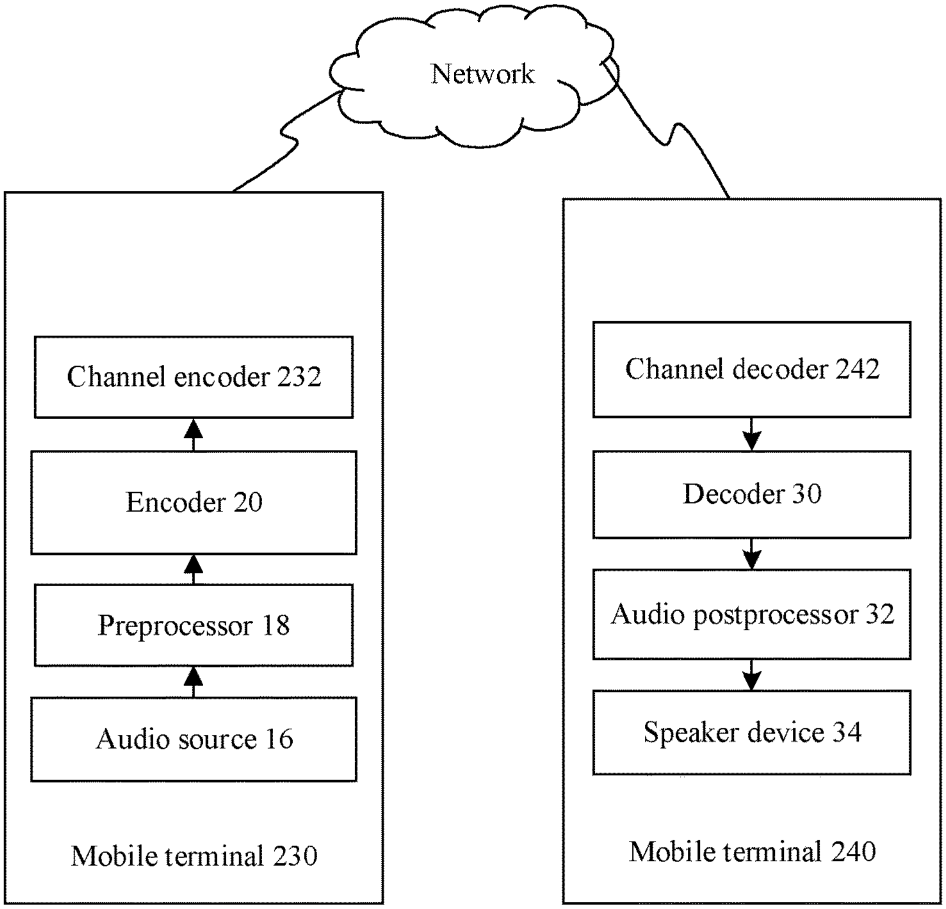
FIG. 2 is a schematic diagram of an audio coding application according to an embodiment of this application.

For example, as shown in FIG. 2, this embodiment is described with an example in which an encoder 20 is disposed in a mobile terminal 230, a decoder 30 is disposed in a mobile terminal 240, the mobile terminal 230 and the mobile terminal 240 are electronic devices that are independent of each other and have an audio signal processing capability, for example, mobile phones, wearable devices, virtual reality (VR) devices, or augmented reality (AR) devices, and the mobile terminal 230 and the mobile terminal 240 are connected through a wireless or wired network.

Optionally, the mobile terminal 230 may include an audio source 16, a preprocessor 18, an encoder 20, and a channel encoder 232. The audio source 16, the preprocessor 18, the encoder 20, and the channel encoder 232 are connected.

Optionally, the mobile terminal 240 may include a channel decoder 242, a decoder 30, an audio postprocessor 32, and a speaker device 34. The channel decoder 242, the decoder 30, the audio postprocessor 32, and the speaker device 34 are connected.

After obtaining an audio signal through the audio source 16, the mobile terminal 230 preprocesses the audio by using the preprocessor 18, encodes the audio signal by using the encoder 20 to obtain a coded bitstream, and then encodes the coded bitstream by using the channel encoder 232 to obtain a transmission signal.

The mobile terminal 230 sends the transmission signal to the mobile terminal 240 through a wireless or wired network.

After receiving the transmission signal, the mobile terminal 240 decodes the transmission signal by using the channel decoder 242 to obtain a coded bitstream; decodes the coded bitstream by using the decoder 30 to obtain an audio signal; processes the audio signal by using the audio postprocessor 32, and then plays the audio signal by using the speaker device 34. It may be understood that the mobile terminal 230 may also include functional modules included in the mobile terminal 240, and the mobile terminal 240 may also include functional modules included in the mobile terminal 230.

Figure 3:
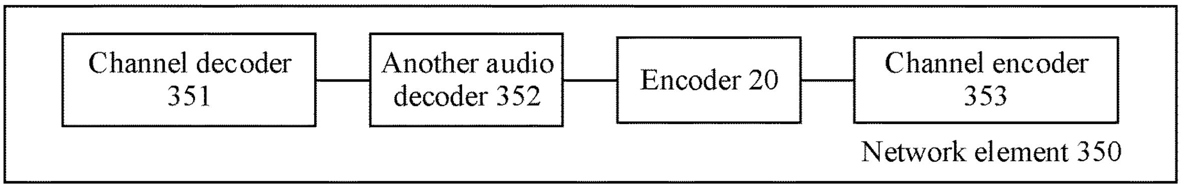
FIG. 3 is a schematic diagram of an audio coding application according to an embodiment of this application.

For example, as shown in FIG. 3, an example in which an encoder 20 and a decoder 30 are disposed in a network element 350 that has an audio signal processing capability in a same core network or wireless network is used for description. The network element 350 may implement transcoding, for example, convert a coded bitstream of another audio encoder (non-multi-channel encoder) into a coded bitstream of a multi-channel encoder. The network element 350 may be a media gateway, a transcoding device, a media resource server, or the like of a radio access network or a core network.

Optionally, the network element 350 includes a channel decoder 351, another audio decoder 352, an encoder 20, and a channel encoder 353. The channel decoder 351, the other audio decoder 352, the encoder 20, and the channel encoder 353 are connected.

After receiving a transmission signal sent by another device, the channel decoder 351 decodes the transmission signal to obtain a first coded bitstream; decodes the first coded bitstream by using the other audio decoder 352 to obtain an audio signal; encodes the audio signal by using the encoder 20 to obtain a second coded bitstream; and encodes the second coded bitstream by using the channel encoder 353 to obtain the transmission signal. That is, the first coded bitstream is converted into the second coded bitstream.

The other device may be a mobile terminal having an audio signal processing capability, or may be another network element having an audio signal processing capability. This is not limited in this embodiment.

Optionally, in this embodiment of this application, a device on which the encoder 20 is installed may be referred to as an audio coding device. During actual implementation, the audio coding device may also have an audio decoding function. This is not limited in this embodiment of this application.

Optionally, in this embodiment of this application, a device on which the decoder 30 is installed may be referred to as an audio decoding device. During actual implementation, the audio decoding device may also have an audio encoding function. This is not limited in this embodiment of this application.

The encoder may perform the audio coding method in embodiments of this application. A process of first coding includes bandwidth extension coding. Each frequency bin of the high frequency band signal corresponds to a spectrum reservation flag. Whether a spectrum value of a frequency bin of the high frequency band signal before bandwidth extension coding is reserved after bandwidth extension coding is indicated by using the spectrum reservation flag. Second coding is performed on the high frequency band signal based on the spectrum reservation flag of each frequency bin of the high frequency band signal, and the spectrum reservation flag of each frequency bin of the high frequency band signal may be used to avoid repeated coding of a tonal component already reserved in bandwidth extension coding. This can improve tonal component coding efficiency.

For example, first coding performed by the audio coding apparatus or a core encoder inside the audio coding apparatus on a high frequency band signal and a low frequency band signal includes bandwidth extension coding, so that a spectrum reservation flag of each frequency bin of the high frequency band signal may be recorded, that is, whether a spectrum of each frequency bin changes before and after bandwidth extension is determined based on the spectrum reservation flag of each frequency bin of the high frequency band signal. The spectrum reservation flag of each frequency bin of the high frequency band signal may be used to avoid repeated coding of a tonal component already reserved in bandwidth extension coding. This can improve tonal component coding efficiency. For a specific implementation thereof, refer to the following specific explanation and description of the embodiment shown in FIG. 4.

Figure 4:
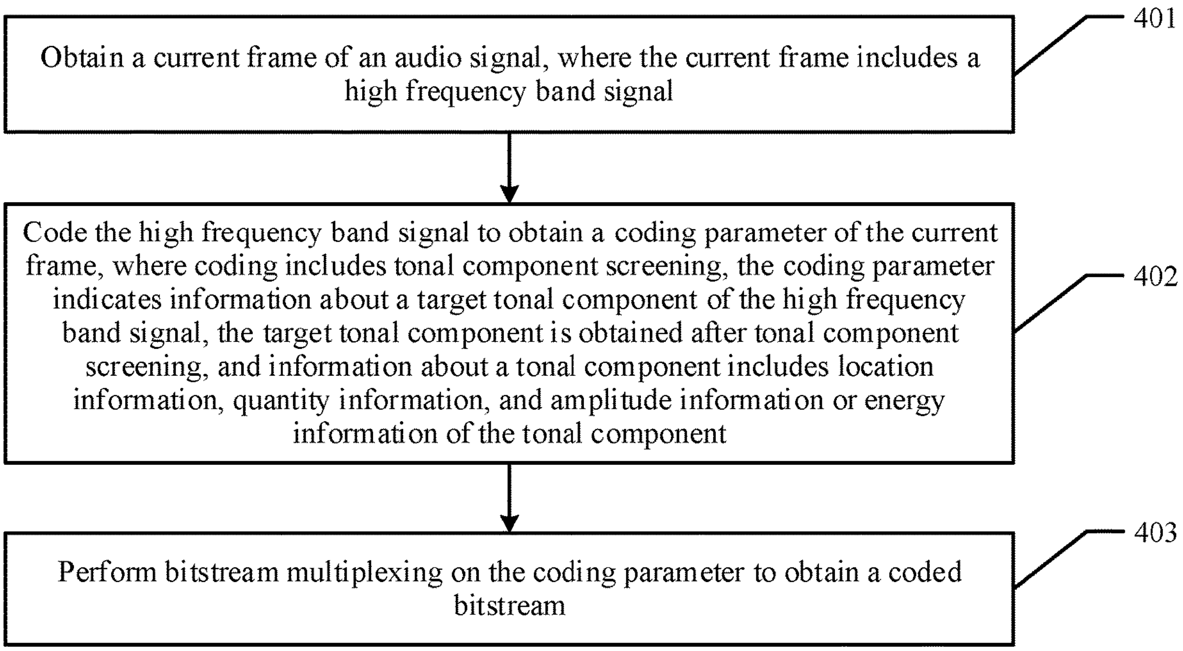
FIG. 4 is a flowchart of an audio coding method according to an embodiment of this application.

FIG. 4 is a flowchart of an audio coding method according to an embodiment of this application. This embodiment of this application may be executed by the foregoing audio coding apparatus or a core encoder inside the audio coding apparatus. As shown in FIG. 4, the method in this embodiment may include the following steps.

401: Obtain a current frame of an audio signal, where the current frame includes a high frequency band signal.

The current frame may be any frame of the audio signal, and the current frame may include the high frequency band signal. It is not limited that, in this embodiment of this application, in addition to the high frequency band signal, the current frame may further include a low frequency band signal. Division into the high frequency band signal and the low frequency band signal may be determined based on a frequency band threshold. A signal above the frequency band threshold is a high frequency band signal, and a signal below the frequency band threshold is a low frequency band signal. The frequency band threshold may be determined based on a transmission bandwidth, and data processing capabilities of the audio coding apparatus and the audio decoding apparatus. This is not limited herein.

The high frequency band signal and the low frequency band signal are relative. For example, a signal below a frequency threshold is a low frequency band signal, and a signal above the frequency threshold is a high frequency band signal (a signal corresponding to the frequency threshold may be divided into either the low frequency band signal or the high frequency band signal). The frequency threshold varies based on a bandwidth of the current frame. For example, when the current frame is a wideband signal with a signal bandwidth 0 kilohertz (kHz) to 8 kHz, the frequency threshold may be 4 kHz; or when the current frame is an ultra-wideband signal with a signal bandwidth 0 kHz to 16 kHz, the frequency threshold may be 8 kHz.

It should be noted that, in this embodiment of the present disclosure, the high frequency band signal may be a part or all of signals in a high frequency area. Further, the high frequency area varies according to different signal bandwidths of the current frame, and also varies according to different frequency thresholds. For example, when the signal bandwidth of the current frame is 0 kHz to 8 kHz, and the frequency threshold is 4 kHz, the high frequency area is 4 kHz to 8 kHz. In this case, the high frequency band signal may be a 4 kHz to 8 kHz signal covering the entire high frequency area, or may be a signal covering only a part of the high frequency area. For example, high frequency band signals may be 4 kHz to 7 kHz, 5 kHz to 8 kHz, 5 kHz to 7 kHz, or 4 kHz to 6 kHz and 7 kHz to 8 kHz (that is, the high frequency band signals may be discontiguous in frequency domain). When the signal bandwidth of the current frame is 0 kHz to 16 kHz, and the frequency threshold is 8 kHz, the high frequency area is 8 kHz to 16 kHz. In this case, the high frequency band signal may be an 8 kHz to 16 kHz signal covering the entire high frequency area, or may be a signal covering only a part of the high frequency area. For example, high frequency band signals may be 8 kHz to 15 kHz, 9 kHz to 16 kHz, 9 kHz to 15 kHz, or 8 kHz to 10 kHz and 11 kHz to 16 kHz (that is, the high frequency band signals may be discontiguous in frequency domain). It may be understood that a frequency range covered by the high frequency band signal may be set as required, or may be adaptively determined based on a frequency range on which subsequent coding in step 402 needs to be performed, for example, may be adaptively determined based on a frequency range on which tonal component screening needs to be performed.

The frequency range on which tonal component screening needs to be performed may be determined based on a quantity of frequency areas on which tonal component screening needs to be performed. Further, the quantity of frequency areas on which tonal component screening needs to be performed may be specified in advance.

402: Code the high frequency band signal to obtain a coding parameter of the current frame, where coding includes tonal component screening, the coding parameter indicates information about a target tonal component of the high frequency band signal, the target tonal component is obtained after tonal component screening, and information about a tonal component includes location information, quantity information, and amplitude information or energy information of the tonal component.

The audio coding apparatus codes the high frequency band signal of the current frame, and may output the coding parameter of the current frame after coding. The coding parameter may also be referred to as a high frequency band parameter. A process of coding shown in step 402 includes tonal component screening. Tonal component screening is screening on tonal components of the high frequency band signal that is being encoded, the coding parameter indicates a target tonal component obtained after tonal component screening, and the target tonal component further refers to a tonal component obtained after tonal component screening in the process of encoding the high frequency band signal. In this embodiment of this application, the information about the target tonal component carried in the coding parameter has undergone tonal component screening. Therefore, better tonal component coding effect can be efficiently obtained by using a limited quantity of coded bits, and audio signal coding quality can be improved.

In this embodiment of this application, the coding parameter of the current frame indicates a location, a quantity, and an amplitude or energy of the target tonal component included in the high frequency band signal. For example, the coding parameter of the current frame includes a location-quantity parameter of the target tonal component, and an amplitude parameter or an energy parameter of the target tonal component. For another example, the coding parameter of the current frame includes a location parameter and a quantity parameter of the target tonal component, and an amplitude parameter or an energy parameter of the target tonal component.

In this embodiment of this application, a high frequency band corresponding to the high frequency band signal includes at least one frequency area, and a frequency area includes at least one subband. A process of obtaining the coding parameter of the current frame based on the high frequency band signal may be performed based on frequency area division and/or subband division of the high frequency band.

The quantity of frequency areas may be predetermined, or may be obtained through calculation according to an algorithm. A manner of determining the frequency area is not limited in this embodiment of this application. Descriptions are further provided in the following embodiment by using an example in which the location-quantity parameter of the target tonal component and the amplitude parameter or the energy parameter of the target tonal component are determined in a frequency area.

In this embodiment of this application, the high frequency band may include K frequency areas (for example, each frequency area is referred to as a tile), each frequency area may further include M subbands, and tonal component screening may be performed in a unit of a frequency area, or may be performed in a unit of a subband. It may be understood that different frequency areas may include different quantities of subbands.

It should be noted that, after step 401 is performed, in addition to step 402, the following step A1 may be further performed.

A1: Perform first coding on the high frequency band signal and the low frequency band signal, to obtain a first coding parameter of the current frame, where first coding includes bandwidth extension coding.

The audio coding apparatus may perform first coding on the high frequency band signal and the low frequency band signal after obtaining the high frequency band signal and the low frequency band signal. First coding may include bandwidth extension coding (that is, audio bandwidth extension coding, bandwidth extension for short below). A bandwidth extension coding parameter (referred to as a bandwidth extension parameter for short) may be obtained through bandwidth extension coding. A decoder side may reconstruct high frequency information in the audio signal based on the bandwidth extension coding parameter. This extends an effective bandwidth of the audio signal and improves quality of the audio signal.

In this embodiment of this application, the high frequency band signal and the low frequency band signal are encoded in the process of first coding, to obtain the first coding parameter of the current frame. The first coding parameter may be used for bitstream multiplexing. In some embodiments, in addition to bandwidth extension coding, first coding may further include processing such as temporal noise shaping, frequency domain noise shaping, or spectrum quantization. Correspondingly, in addition to the bandwidth extension coding parameter, the first coding parameter may further include a temporal noise shaping parameter, a frequency domain noise shaping parameter, a spectrum quantization parameter, or the like. For the process of first coding, details are not described in this embodiment of this application.

It should be noted that encoding of the high frequency band signal and the low frequency band signal in step A1 may be referred to as first coding, and step 402 may be performed after step A1. In this case, encoding of the high frequency band signal in step 402 may be referred to as second coding. Descriptions are provided in the following embodiment by using the coding process including tonal component screening in step 402 as second coding.

403: Perform bitstream multiplexing on the coding parameter to obtain a coded bitstream.

The audio coding apparatus performs bitstream multiplexing on the coding parameter to obtain the coded bitstream. For example, the coded bitstream may be a payload bitstream. The payload bitstream may carry specific information of each frame of the audio signal, for example, may carry information about a target tonal component of each frame. Bitstream multiplexing may be performed on the coding parameter to obtain the coded bitstream, and the information about the target tonal component that is carried in the coded bitstream and that is obtained in this embodiment of this application has undergone tonal component screening. Therefore, better tonal component coding effect can be efficiently obtained by using a limited quantity of coded bits, and audio signal coding quality can be improved.

In some embodiments of this application, a coding parameter obtained by coding the high frequency band signal and the low frequency band signal may be defined as a first coding parameter, and the coding parameter obtained in step 402 may be defined as a second coding parameter. In this case, bitstream multiplexing may be further performed on the first coding parameter and the second coding parameter in step 403 to obtain the coded bitstream. For example, the coded bitstream may be a payload bitstream.

In some embodiments, the coded bitstream may further include a configuration bitstream, and the configuration bitstream may carry configuration information shared by all frames of the audio signal. The payload bitstream and the configuration bitstream may be independent of each other; or may be included in a same bitstream, that is, the payload bitstream and the configuration bitstream may be different parts in the same bitstream.

The audio coding apparatus sends the coded bitstream to the audio decoding apparatus, and the audio decoding apparatus performs bitstream demultiplexing on the coded bitstream, to obtain the coding parameter, and further accurately obtain the current frame of the audio signal.

It can be learned from the example descriptions of this application in the foregoing embodiment that the current frame of the audio signal is obtained, the high frequency band signal is coded to obtain the coding parameter of the current frame, and bitstream multiplexing is performed on the coding parameter to obtain the coded bitstream. The current frame includes the high frequency band signal. Coding includes tonal component screening, the coding parameter indicates the information about the target tonal component of the high frequency band signal, the target tonal component is obtained after tonal component screening, and the information about the tonal component includes the location information, the quantity information, and the amplitude information or the energy information of the tonal component. In this embodiment of this application, the coding process includes tonal component screening, the coding parameter indicates the target tonal component obtained after tonal component screening, bitstream multiplexing may be performed on the coding parameter to obtain the coded bitstream, and the information about the target tonal component that is carried in the coded bitstream and that is obtained in this embodiment of this application has undergone tonal component screening. Therefore, better tonal component coding effect can be efficiently obtained by using a limited quantity of coded bits, and audio signal coding quality can be improved.

Figure 5:
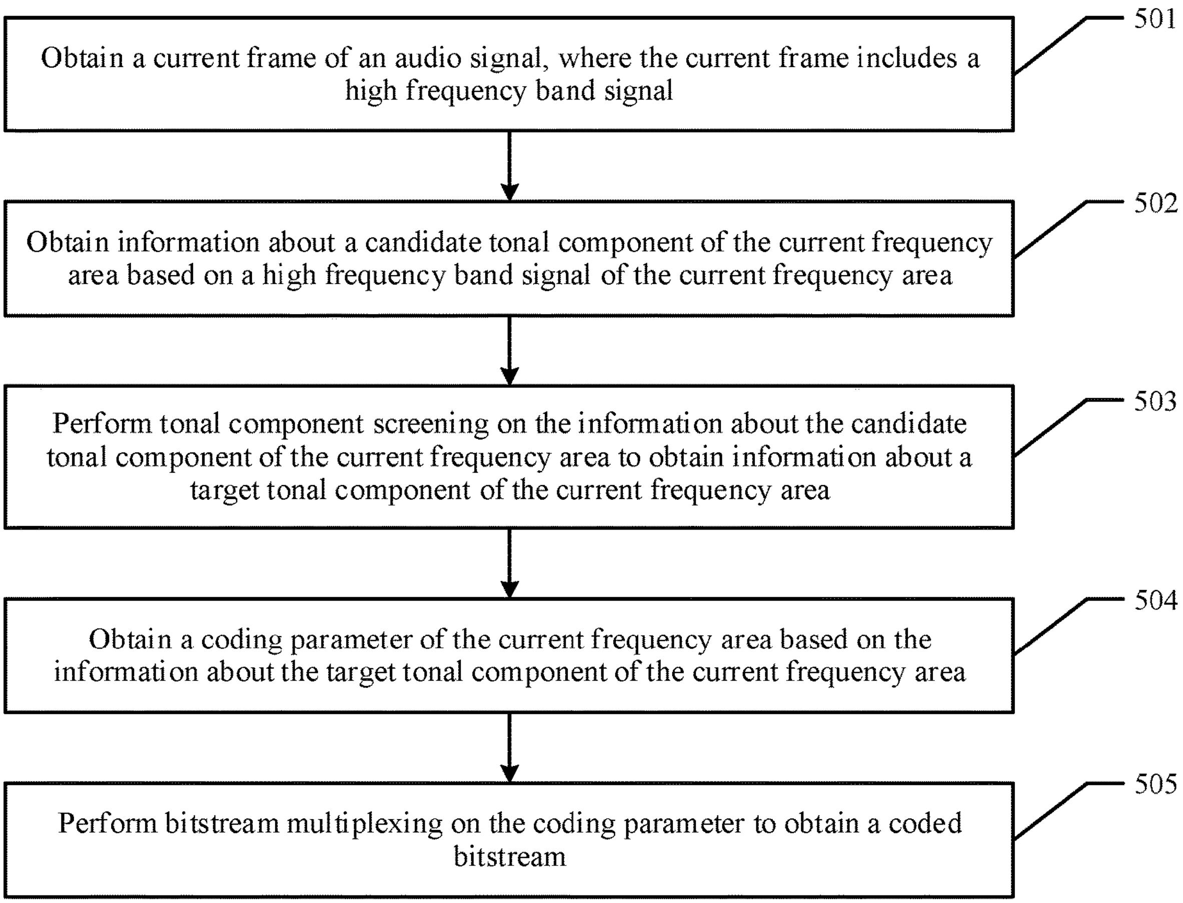
FIG. 5 is a flowchart of another audio coding method according to an embodiment of this application.

Next, refer to some other embodiments provided in this application. An embodiment of this application may be executed by the foregoing audio coding apparatus or a core encoder inside the audio coding apparatus. As shown in FIG. 5, the audio coding method provided in this embodiment of this application may include the following steps.

501: Obtain a current frame of an audio signal, where the current frame includes a high frequency band signal.

Step 501 performed by the audio coding apparatus is similar to step 401 in the foregoing embodiment. Details are not described herein again.

After the audio coding apparatus performs step 501, the audio coding apparatus may code the high frequency band signal of the current frame to obtain a coding parameter of the current frame. A high frequency band corresponding to the high frequency band signal includes at least one frequency area. A quantity of frequency areas included in the high frequency band is not limited in this embodiment of this application. For example, the at least one frequency area includes a current frequency area, and the current frequency area may be a frequency area in the at least one frequency area or any one of the at least one frequency area. This is not limited herein.

The following provides descriptions by using a coding process of a high frequency band signal of the current frequency area as an example. Further, the audio coding apparatus may perform subsequent step 502 to step 504.

502: Obtain information about a candidate tonal component of the current frequency area based on a high frequency band signal of the current frequency area.

In this embodiment of this application, the audio coding apparatus extracts the information about the candidate tonal component of the current frequency area from the high frequency band signal of the current frequency area after obtaining the high frequency band signal of the current frequency area. The information about the candidate tonal component may include location information, quantity information, and amplitude information or energy information of the candidate tonal component. The information about the target tonal component can be obtained only by performing tonal component screening in subsequent step 503 on the information about the candidate tonal component.

The audio coding apparatus may perform peak search based on the high frequency band signal of the current frequency area, and directly use obtained information about a peak in the current frequency area as the information about the candidate tonal component of the current frequency area. The information about the peak in the current frequency area includes quantity information of the peak, location information of the peak, and energy information of the peak or amplitude information of the peak in the current frequency area. Further, a power spectrum of the high frequency band signal of the current frequency area may be obtained based on the high frequency band signal of the current frequency area. A peak of the power spectrum is searched for based on the power spectrum of the high frequency band signal of the current frequency area (current area for short). A quantity of peaks of the power spectrum is used as the quantity information of the peak in the current area, a frequency bin sequence number corresponding to the peak of the power spectrum is used as the location information of the peak in the current area, and an amplitude or energy of the peak of the power spectrum is used as the amplitude information of the peak or energy information of the peak in the current area. Alternatively, a power spectrum ratio of a current frequency bin in the current frequency area may be obtained based on the high frequency band signal of the current frequency area, where the power spectrum ratio of the current frequency bin is a ratio of a power spectrum value of the current frequency bin to a mean value of power spectrums of the current frequency area. Peak search is performed in the current frequency area based on the power spectrum ratio of the current frequency bin, to obtain the quantity information of the peak, the location information of the peak, the amplitude information of the peak or the energy information of the peak in the current frequency area. The amplitude information of the peak or the energy information of the peak includes a power spectrum ratio of the peak, and the power spectrum ratio of the peak is a ratio of a power spectrum value of a frequency bin corresponding to the peak to the mean value of the power spectrums of the current frequency area. Certainly, peak search may alternatively be performed in another manner to obtain the quantity information of the peak, the location information of the peak, and the amplitude information of the peak or the energy information of the peak in the current area. This is not limited in this embodiment of this application.

In some embodiments of this application, the quantity information of the candidate tonal component may be the quantity information of the peak obtained through peak search, the location information of the candidate tonal component may be the location information of the peak obtained through peak search, the amplitude information of the candidate tonal component may be the amplitude information of the peak obtained through peak search, and the energy information of the candidate tonal component may be the energy information of the peak obtained through peak search.

In an embodiment of this application, the location information and the energy information of the candidate tonal component of the current frequency area are respectively stored in peak_idx and peak_val arrays, and the quantity information of the candidate tonal component of the current frequency area is denoted as peak_cnt.

The high frequency band signal on which peak search is performed may be a frequency domain signal, or may be a time domain signal.

Further, in an implementation, peak search may be specifically performed based on at least one of a power spectrum, an energy spectrum, or an amplitude spectrum of the current frequency area.

503: Perform tonal component screening on the information about the candidate tonal component of the current frequency area to obtain information about a target tonal component of the current frequency area.

In this embodiment of this application, the audio coding apparatus performs tonal component screening on the information about the candidate tonal component of the current frequency area, and can obtain the information about the target tonal component of the current frequency area by performing tonal component screening.

Further, the information about the candidate tonal component includes the quantity information, the location information, and the amplitude information or the energy information of the candidate tonal component. Tonal component screening may be performed based on the quantity information, the location information, and the amplitude information or the energy information of the candidate tonal component, to obtain quantity information, location information, and amplitude information or energy information of a tonal-component-screened candidate tonal component; and the quantity information, location information, and amplitude information or energy information of the tonal-component-screened candidate tonal component is used as quantity information, location information, and amplitude information or energy information of the target tonal component of the current frequency area. Tonal component screening may be one or more of processing such as combination processing, quantity screening, and inter-frame continuity correction. Whether to perform other processing, a type included in the other processing, and a processing method are not limited in this embodiment of this application.

504: Obtain the coding parameter of the current frequency area based on the information about the target tonal component of the current frequency area.

In this embodiment of this application, the audio coding apparatus may obtain the coding parameter of the current frequency area based on the information about the target tonal component of the current frequency area. It should be noted that the coding parameter of the current frequency area obtained herein is similar to the coding parameter obtained in step 402 in the foregoing embodiment. A difference lies in that the coding parameter of the current frame is obtained in step 402 while the coding parameter of the current frequency area of the current frame is obtained in step 504. Coding parameters of all frequency areas of the current frame may be obtained in an implementation similar to that in step 504, and the coding parameters of all the frequency areas of the current frame constitute the coding parameter of the current frame. In addition, the coding parameter of the current frequency area obtained in step 504 may be referred to as a second coding parameter. The second coding parameter of the current frequency area includes a location-quantity parameter of the target tonal component of the current frequency area and an amplitude parameter or an energy parameter of the target tonal component. The location-quantity parameter indicates location information and quantity information of a target tonal component of the high frequency band signal, the amplitude parameter indicates amplitude information of the target tonal component of the high frequency band signal, and the energy parameter indicates energy information of the target tonal component of the high frequency band signal.

505: Perform bitstream multiplexing on the coding parameter to obtain a coded bitstream.

In the foregoing embodiment, the audio coding apparatus performs step 504 to obtain the coding parameter, and finally performs bitstream multiplexing on the coding parameter to obtain the coded bitstream, where the coded bitstream may be the payload bitstream. The payload bitstream may carry the specific information of each frame of the audio signal, for example, may carry the information about a tonal component of each frame. Bitstream multiplexing may be performed on the coded bitstream to obtain the coding parameter. The information about the target tonal component that is carried in the coded bitstream and that is obtained in this embodiment of this application has undergone tonal component screening.

The audio coding apparatus sends the coded bitstream to an audio decoding apparatus, and the audio decoding apparatus performs bitstream demultiplexing on the coded bitstream, to obtain the coding parameter, and further accurately obtain the current frame of the audio signal.

It can be learned from the example descriptions of this application in the foregoing embodiments that, in this embodiment of this application, the coding process includes tonal component screening on the information about the candidate tonal component, the coding parameter indicates the target tonal component obtained after tonal component screening, bitstream multiplexing may be performed on the coding parameter to obtain the coded bitstream, and the information about the target tonal component that is carried in the coded bitstream and that is obtained in this embodiment of this application has undergone tonal component screening. Therefore, better tonal component coding effect can be efficiently obtained by using a limited quantity of coded bits, and audio signal coding quality can be improved.

Figure 6:
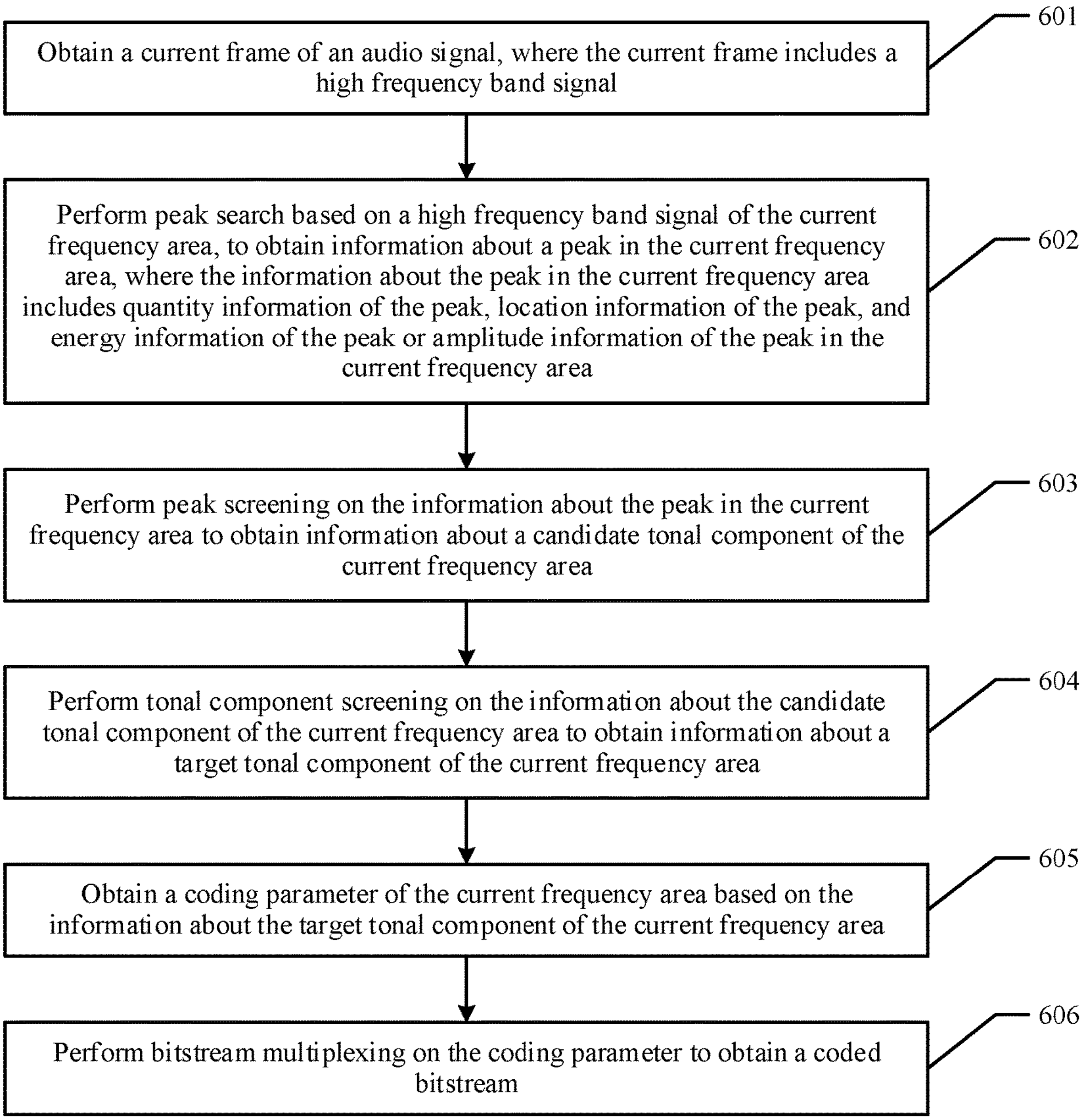
FIG. 6 is a flowchart of another audio coding method according to an embodiment of this application.

Next, refer to some other embodiments provided in this application. An embodiment of this application may be executed by the foregoing audio coding apparatus or a core encoder inside the audio coding apparatus. As shown in FIG. 6, the method in this embodiment may include the following steps.

601: Obtain a current frame of an audio signal, where the current frame includes a high frequency band signal.

Step 601 performed by the audio coding apparatus is similar to step 401 in the foregoing embodiment. Details are not described herein again.

After the audio coding apparatus performs step 601, the audio coding apparatus may code the high frequency band signal of the current frame to obtain a coding parameter of the current frame. A high frequency band corresponding to the high frequency band signal includes at least one frequency area, and a quantity of frequency areas included in the high frequency band is not limited in this embodiment of this application. For example, the at least one frequency area includes a current frequency area, and the current frequency area may be a frequency area in the at least one frequency area or any one of the at least one frequency area. This is not limited herein.

The following provides descriptions by using a coding process of a high frequency band signal of the current frequency area as an example. Further, the audio coding apparatus may perform subsequent step 602 to step 605.

602: Perform peak search based on a high frequency band signal of the current frequency area, to obtain information about a peak in the current frequency area, where the information about the peak in the current frequency area includes quantity information of the peak, location information of the peak, and energy information of the peak or amplitude information of the peak in the current frequency area.

In this embodiment of this application, the audio coding apparatus may perform peak search based on the high frequency band signal of the current frequency area to obtain the information about the peak in the current frequency area. Further, a power spectrum of the high frequency band signal of the current frequency area may be obtained based on the high frequency band signal of the current frequency area. A peak of the power spectrum is searched for based on the power spectrum of the high frequency band signal of the current frequency area (current area). A quantity of peaks of the power spectrum is used as the quantity information of the peak in the current area, a frequency bin sequence number corresponding to the peak of the power spectrum is used as the location information of the peak in the current area, and an amplitude or energy of the peak of the power spectrum is used as the amplitude information of the peak or energy information of the peak in the current area. Alternatively, a power spectrum ratio of a current frequency bin in the current frequency area may be obtained based on the high frequency band signal of the current frequency area, where the power spectrum ratio of the current frequency bin is a ratio of a power spectrum value of the current frequency bin to a mean value of power spectrums of the current frequency area. Peak search is performed in the current frequency area based on the power spectrum ratio of the current frequency bin, to obtain the quantity information of the peak, the location information of the peak, the amplitude information of the peak or the energy information of the peak in the current frequency area. The amplitude information of the peak or the energy information of the peak includes a power spectrum ratio of the peak, and the power spectrum ratio of the peak is a ratio of a power spectrum value of a frequency bin corresponding to the peak to the mean value of the power spectrums of the current frequency area. Certainly, peak search may alternatively be performed in another manner to obtain the quantity information of the peak, the location information of the peak, and the amplitude information of the peak or the energy information of the peak in the current area. This is not limited in this embodiment of this application.

In an embodiment of this application, peak search may be further performed based on at least one of a power spectrum, an energy spectrum, or an amplitude spectrum of the current frequency area.

603: Perform peak screening on the information about the peak in the current frequency area to obtain information about a candidate tonal component of the current frequency area.

After obtaining the information about the peak in the current frequency area, the audio coding apparatus performs peak screening on the information about the peak in the current frequency area to obtain the information about the candidate tonal component of the current frequency area. A specific manner of peak screening may be: based on information about a bandwidth extension spectrum reservation flag of the current frequency area and the quantity information of the peak, the location information of the peak, and the amplitude information of the peak or the energy information of the peak in the current frequency area, obtaining screened quantity information of the peak, screened location information of the peak, and screened amplitude information of the peak or energy information of the peak in the current frequency area. The screened quantity information of the peak, the screened location information of the peak, and the screened amplitude information of the peak or the screened energy information of the peak in the current frequency area are used as the information about the candidate tonal component of the current frequency area. For example, the amplitude information of the peak or the energy information of the peak may include an energy ratio of the peak or a power spectrum ratio of the peak.

In some embodiments of this application, the quantity information of the candidate tonal component may be peak-screened quantity information of the peak, the location information of the candidate tonal component may be peak-screened location information of the peak, the amplitude information of the candidate tonal component may be peak-screened amplitude information of the peak, and the energy information of the candidate tonal component may be peak-screened energy information of the peak.

The audio coding apparatus may obtain a value of a spectrum reservation flag of each frequency bin in the high frequency band signal in a plurality of manners, which is described in detail in the following.

In some embodiments of this application, a value of a spectrum reservation flag of a first frequency bin that is in the current frequency area of the at least one frequency area and that does not belong to a frequency range of bandwidth extension coding is a first preset value.

Alternatively, for a second frequency bin that is in the current frequency area and that belongs to a frequency range of bandwidth extension, a value of a spectrum reservation flag of the second frequency bin is a second preset value if a spectrum value corresponding to the second frequency bin before bandwidth extension coding and a spectrum value after bandwidth extension coding meet a preset condition, or a value of a spectrum reservation flag of the second frequency bin is a third preset value if a spectrum value corresponding to the second frequency bin before bandwidth extension coding and a spectrum value after bandwidth extension coding does not meet a preset condition.

Further, the audio coding apparatus first determines whether a frequency bin in the current frequency area belongs to the frequency range of bandwidth extension coding. For example, the first frequency bin is defined as a frequency bin that is in the current frequency area and that does not belong to the frequency range of bandwidth extension coding, and the second frequency bin is defined as a frequency bin that is in the current frequency area and that belongs to the frequency range of bandwidth extension coding. In this case, the value of the spectrum reservation flag of the first frequency bin is the first preset value. The spectrum reservation flag of the second frequency bin has two values, for example, the second preset value and the third preset value. Further, the value of the spectrum reservation flag of the second frequency bin is the second preset value when the spectrum value corresponding to the second frequency bin before bandwidth extension coding and the spectrum value corresponding to the second frequency bin after bandwidth extension coding meet the preset condition. The value of the spectrum reservation flag of the second frequency bin is the third preset value when the spectrum value corresponding to the second frequency bin before bandwidth extension coding and the spectrum value corresponding to the second frequency bin after bandwidth extension coding do not meet the preset condition. The preset condition may be implemented in a plurality of manners. This is not limited herein. For example, the preset condition is a condition specified for a spectrum value before bandwidth extension coding and a spectrum value after bandwidth extension coding, which may be specifically determined based on an application scenario.

604: Perform tonal component screening on the information about the candidate tonal component of the current frequency area to obtain information about a target tonal component of the current frequency area.

In this embodiment of this application, the information about the candidate tonal component of the current frequency area obtained by the audio coding apparatus includes location information, quantity information, and amplitude information or energy information of the candidate tonal component. Tonal component screening is performed on the information about the candidate tonal component of the current frequency area to obtain the information about the target tonal component of the current frequency area.

Further, the information about the candidate tonal component includes the quantity information, the location information, and the amplitude information or the energy information of the candidate tonal component. Tonal component screening may be performed based on the quantity information, the location information, and the amplitude information or the energy information of the candidate tonal component, to obtain quantity information, location information, and amplitude information or energy information of a tonal-component-screened candidate tonal component; and the quantity information, location information, and amplitude information or energy information of the tonal-component-screened candidate tonal component is used as quantity information, location information, and amplitude information or energy information of the target tonal component of the current frequency area. Tonal component screening may be one or more of processing such as combination processing, quantity screening, and inter-frame continuity correction. Whether to perform other processing, a type included in the other processing, and a processing method are not limited in this embodiment of this application.

605: Obtain the coding parameter of the current frequency area based on the information about the target tonal component of the current frequency area.

In this embodiment of this application, the audio coding apparatus may obtain the coding parameter of the current frequency area based on the information about the target tonal component of the current frequency area. It should be noted that the coding parameter of the current frequency area obtained herein is similar to the coding parameter obtained in step 402 in the foregoing embodiment. A difference lies in that the coding parameter of the current frame is obtained in step 402 while the coding parameter of the current frequency area of the current frame is obtained in step 605. Coding parameters of all frequency areas of the current frame may be obtained in an implementation similar to that in step 605, and the coding parameters of all the frequency areas of the current frame constitute the coding parameter of the current frame. In addition, the coding parameter of the current frequency area obtained in step 605 may be referred to as a second coding parameter. The second coding parameter of the current frequency area includes a location-quantity parameter of the target tonal component of the current frequency area and an amplitude parameter or an energy parameter of the target tonal component. The location-quantity parameter indicates location information and quantity information of a target tonal component of the high frequency band signal, the amplitude parameter indicates amplitude information of the target tonal component of the high frequency band signal, and the energy parameter indicates energy information of the target tonal component of the high frequency band signal.

606: Perform bitstream multiplexing on the coding parameter to obtain a coded bitstream.

The audio coding apparatus performs bitstream multiplexing on the coding parameter to obtain the coded bitstream. For example, the coded bitstream may be a payload bitstream. The payload bitstream may carry specific information of each frame of the audio signal, for example, may carry information about a tonal component of each frame. Bitstream multiplexing may be performed on the coded bitstream to obtain the coding parameter. The information about the target tonal component that is carried in the coded bitstream and that is obtained in this embodiment of this application has undergone tonal component screening.

The audio coding apparatus sends the coded bitstream to an audio decoding apparatus, and the audio decoding apparatus performs bitstream demultiplexing on the coded bitstream, to obtain the coding parameter, and further accurately obtain the current frame of the audio signal.

It can be learned from the example descriptions of this application in the foregoing embodiments that, in this embodiment of this application, the coding process includes peak screening on the information about the peak in the current frequency area and tonal component screening on the information about the candidate tonal component, the coding parameter indicates the target tonal component obtained after tonal component screening, bitstream multiplexing may be performed on the coding parameter to obtain the coded bitstream, and the information about the target tonal component that is carried in the coded bitstream and that is obtained in this embodiment of this application has undergone tonal component screening. Therefore, better tonal component coding effect can be efficiently obtained by using a limited quantity of coded bits, and audio signal coding quality can be improved.

In some embodiments of this application, the high frequency band corresponding to the high frequency band signal includes at least one frequency area. A quantity of frequency areas included in the high frequency band is not limited in this embodiment of this application. For example, the at least one frequency area includes a current frequency area, and the current frequency area may be a frequency area in the at least one frequency area or any one of the at least one frequency area. This is not limited herein.

The following provides descriptions by using a coding process of a high frequency band signal of the current frequency area as an example. After the audio coding apparatus obtains the information about the candidate tonal component of the current frequency area, the audio coding apparatus may perform step 503 or step 604 in the foregoing embodiment of performing tonal component screening on the information about the candidate tonal component of the current frequency area to obtain the information about the target tonal component of the current frequency area.

In this embodiment of this application, the current frequency area may include one or more subbands, and a quantity of subbands included in the current frequency area is not limited. For example, the current frequency area includes a current subband, and the current subband may be a subband in the current frequency area or any subband in the current frequency area. This is not limited herein.

The following provides descriptions by using a process of performing tonal component screening on the current subband as an example. In this embodiment of this application, tonal component screening may include at least one of the following: candidate tonal component combination processing, inter-frame continuity refining processing, and quantity screening.

Figure 7:
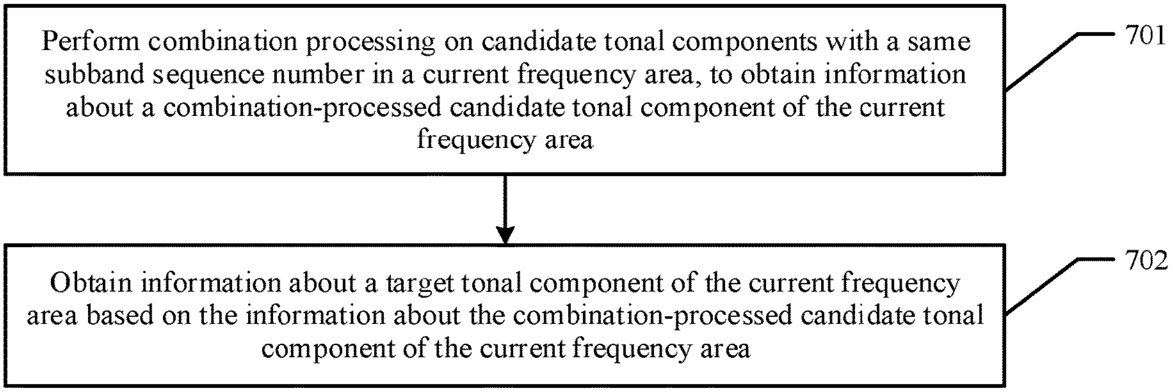
FIG. 7 is a flowchart of another audio coding method according to an embodiment of this application.

Further, as shown in FIG. 7, descriptions are provided by using an example in which tonal component screening includes combination processing. The performing, by the audio coding apparatus, tonal component screening on the information about the candidate tonal component of the current frequency area to obtain the information about the target tonal component of the current frequency area includes the following steps.

701: Perform combination processing on candidate tonal components with a same subband sequence number in the current frequency area, to obtain information about a combination-processed candidate tonal component of the current frequency area.

The audio coding apparatus may obtain subband sequence numbers corresponding to all candidate tonal components of the current frequency area, and perform combination on the candidate tonal components with the same subband sequence number in the current frequency area. For example, two candidate tonal components of the current frequency area may be combined into one combination-processed candidate tonal component of the current frequency area if the two candidate tonal components belong to a same subband. For a subband that includes only one candidate tonal component or includes no candidate tonal component and that is in the current frequency area, combination processing does not need to be performed. The information about the combination-processed candidate tonal component is obtained by performing combination processing in the current frequency area. It is not limited that, in this embodiment of this application, if three or more candidate tonal components of the current frequency area belong to a same subband, the three or more candidate tonal components may be combined into one candidate tonal component of the current frequency area.

In some embodiments of this application, each subband of the current frequency area has a subband sequence number, and the subband sequence number is determined based on the location information of the candidate tonal component of the current frequency area and the subband width of the current frequency area. For example, a subband sequence number corresponding to each candidate tonal component of the current frequency area is obtained through calculation based on the subband width of the current frequency area and the location information of the candidate tonal component of the current frequency area.

In some embodiments of this application, the subband width of the current frequency area is a preset first value, or the subband width of the current frequency area is determined based on a sequence number of the current frequency area included in the high frequency band corresponding to the high frequency band signal.

The subband width of the current frequency area has a plurality of values. For example, the subband width of the current frequency area is a first value, that is, the subband width of the current frequency area is a fixed value. Alternatively, the subband width of the current frequency area is obtained through calculation, for example, the subband width of the current frequency area is determined based on a sequence number of the current frequency area included in the high frequency band corresponding to the high frequency band signal, and adaptive selection is performed based on different current frequency areas. The subband width may be a quantity of frequency bins included in one subband, and subband widths of different frequency areas may be different.

In some embodiments of this application, step 701 of performing combination processing on candidate tonal components with a same subband sequence number in the current frequency area, to obtain information about a combination-processed candidate tonal component may further include: if the quantity of candidate tonal components of the current frequency area is greater than or equal to 2, determining two candidate tonal components in adjacent locations in the current frequency area as a first candidate tonal component and a second candidate tonal component of the current frequency area; and separately obtaining a first subband sequence number corresponding to the first candidate tonal component and a second subband sequence number corresponding to the second candidate tonal component; and if the first subband sequence number is the same as the second subband sequence number, performing combination processing on the first candidate tonal component and the second candidate tonal component, to obtain information about a first combined candidate tonal component. A subband sequence number corresponding to the first combined candidate tonal component is equal to the first subband sequence number or the second subband sequence number.

Further, if a third candidate tonal component adjacent to the second candidate tonal component in location further exists in the candidate tonal components of the current frequency area, a third subband sequence number corresponding to the third candidate tonal component is obtained; if the third subband sequence number is the same as the subband sequence number corresponding to the first combined candidate tonal component, combination processing is performed on the first combined candidate tonal component and the third candidate tonal component, to obtain information about a combination-processed candidate tonal component of the current frequency area.

If the third candidate tonal component adjacent to the second candidate tonal component in location does not exist in the candidate tonal components of the current frequency area, information about the first combined candidate tonal component is information about a combination-processed candidate tonal component.

It may be understood that, if a fourth candidate tonal component adjacent to the third candidate tonal component in location further exists in the current frequency area, combination may also be performed based on the foregoing manner when subband sequence numbers are the same, to obtain information about a combination-processed candidate tonal component of the current frequency area.

In some embodiments of this application, the at least one subband includes a current subband.

The information about the combination-processed candidate tonal component of the current frequency area includes location information of a combination-processed candidate tonal component of the current subband, and amplitude information or energy information of the combination-processed candidate tonal component of the current subband; the location information of the combination-processed candidate tonal component of the current subband includes location information of one candidate tonal component in candidate tonal components of the current subband that do not undergo combination processing; and the amplitude information or the energy information of the combination-processed candidate tonal component of the current subband includes amplitude information or energy information of the one candidate tonal component in the candidate tonal components of the current subband that do not undergo combination processing, or the amplitude information or the energy information of the combination-processed candidate tonal component of the current subband is obtained through calculation based on amplitude information or energy information of the candidate tonal components of the current subband that do not undergo combination processing.

Further, the at least one subband includes the current subband, and the combination-processed candidate tonal component of the current subband may be one candidate tonal component in the candidate tonal components of the current subband. That is, information about the one candidate tonal component in the candidate tonal components of the current subband is the combination-processed candidate tonal component of the current subband. Further, the location information of the combination-processed candidate tonal component of the current subband includes location information of the one candidate tonal component in the candidate tonal components of the current subband, and the amplitude information or the energy information of the combination-processed candidate tonal component of the current subband includes amplitude information or energy information of the one candidate tonal component in the candidate tonal components of the current subband, or the amplitude information or the energy information of the combination-processed candidate tonal component of the current subband is performed is obtained through calculation based on amplitude information or energy information of the candidate tonal components of the current subband. A calculation manner is not limited. For example, a mean value of the amplitude information or the energy information of a plurality of candidate tonal components of the current subband may be used as the amplitude information or the energy information of the combination-processed candidate tonal component of the current subband. For another example, a sum of the amplitude information or the energy information of a plurality of candidate tonal components of the current subband may be used as the amplitude information or the energy information of the combination-processed candidate tonal component of the current subband. For another example, a calculation manner may alternatively be performing weighted averaging on the amplitude information or the energy information of a plurality of candidate tonal components of the current subband. This is not limited herein. In this embodiment of this application, through combination processing, the information about the combination-processed candidate tonal component of the current subband may be obtained based on information about the candidate tonal components of the current subband.

In some embodiments of this application, the information about the combination-processed candidate tonal component of the current frequency area further includes quantity information of the combination-processed candidate tonal component of the current frequency area; and the quantity information of the combination-processed candidate tonal component of the current frequency area is the same as information about a quantity of subbands having a candidate tonal component in the current frequency area. A subband having a candidate tonal component in the current frequency area is a subband that includes a candidate tonal component before combination processing and that is in the current frequency area. In this embodiment of this application, through combination processing, the information about the combination-processed candidate tonal component of the current frequency area may be obtained based on the information about the candidate tonal components of the current frequency area.

In some embodiments of this application, before step 701 of performing combination processing on candidate tonal components with a same subband sequence number in the current frequency area, the audio coding method provided in this embodiment of this application further includes the following step:

B1: Arrange, based on location information of candidate tonal components of the current frequency area, the candidate tonal components of the current frequency area in ascending or descending order of locations to obtain the location-arranged candidate tonal components of the current frequency area.

Further, in a case in which step B1 is performed, step 701 of performing combination processing on candidate tonal components with a same subband sequence number in the current frequency area may further include performing combination processing on the candidate tonal components with the same subband sequence number in the current frequency area based on the location-arranged candidate tonal components of the current frequency area.

Combination processing may be arranging, based on the location information of the candidate tonal components of the current frequency area, the candidate tonal components in ascending or descending order of location information; for the candidate tonal components arranged in ascending or descending order of the location information, calculating subband sequence numbers corresponding to two candidate tonal components adjacent in location information; and if the subband sequence numbers corresponding to the two candidate tonal components in adjacent locations are the same, performing combination processing on the two candidate tonal components to obtain quantity information, location information, and energy information or amplitude information of a combined candidate tonal component of the current frequency area. A subband sequence number is determined based on location information of a candidate tonal component and a subband width of a current frequency area. The subband width of the current frequency area may be a preset value, or may be adaptively selected based on different frequency areas. The subband width may be a quantity of frequency bins included in a subband. Subband widths of different frequency areas may be different. Location information of a combined candidate tonal component may be location information of any one of two candidate tonal components adjacent in location, and energy information or amplitude information of the combined candidate tonal component may be energy information or amplitude information of any one of the two candidate tonal components in adjacent locations, or may be obtained through calculation based on energy information or amplitude information of the two candidate tonal components in the adjacent locations.

702: Obtain the information about the target tonal component of the current frequency area based on the information about the combination-processed candidate tonal component of the current frequency area.

After performing step 701 to obtain the information about the combination-processed candidate tonal component of the current frequency area, the audio coding apparatus may obtain the information about the target tonal component of the current frequency area based on the information about the combination-processed candidate tonal component of the current frequency area. Further, an association relationship between the information about the combination-processed candidate tonal component of the current frequency area and the information about the target tonal component may be implemented in a plurality of manners.

In some embodiments of this application, the information about the combination-processed candidate tonal component is directly used as the information about the target tonal component.

In some embodiments of this application, step 702 of obtaining the information about the target tonal component of the current frequency area based on the information about the combination-processed candidate tonal component of the current frequency area includes the following step:

C1: Obtain the information about the target tonal component of the current frequency area based on the information about the combination-processed candidate tonal component of the current frequency area and information about a maximum quantity of codable tonal components of the current frequency area.

Tonal component screening may include quantity screening processing. The audio coding apparatus may perform, based on the information about the maximum quantity of codable tonal components of the current frequency area, quantity screening processing on the information about the combination-processed candidate tonal component obtained in step 701. The information about the maximum quantity of codable tonal components of the current frequency area refers to a maximum quantity of tonal components of the current frequency area that are able to be used for coding. The information about the maximum quantity of codable tonal components of the current frequency area may be set to a preset second value, or may be obtained through selection based on a coding rate. Information about a quantity-screened candidate tonal component of the current frequency area is obtained by performing quantity screening based on the information about the combination-processed candidate tonal component and the information about the maximum quantity of codable tonal components of the current frequency area. In this case, the information about the quantity-screened candidate tonal component of the current frequency area is the information about the target tonal component of the current frequency area.

In this embodiment of this application, the audio coding apparatus performs, based on the information about the maximum quantity of codable tonal components of the current frequency area, quantity screening processing on the information about the combination-processed candidate tonal component to obtain the information about the quantity-screened candidate tonal component of the current frequency area. Performing quantity screening processing can reduce a quantity of candidate tonal components of the current frequency area, and further improve audio signal coding efficiency.

Further, in some embodiments of this application, step C1 of obtaining the information about the target tonal component of the current frequency area based on the information about the combination-processed candidate tonal component of the current frequency area and information about a maximum quantity of codable tonal components of the current frequency area includes the following steps.

C11: Arrange combination-processed candidate tonal components of the current frequency area based on energy information or amplitude information of the combination-processed candidate tonal components of the current frequency area, to obtain information about the candidate tonal components arranged based on the energy information or the amplitude information.

After obtaining the information about the combination-processed candidate tonal components of the current frequency area, the audio coding apparatus may first arrange candidate tonal components of the current frequency area in ascending or descending order of energy information or amplitude information of the candidate tonal components.

C12: Obtain the information about the target tonal component of the current frequency area based on the information about the maximum quantity of codable tonal components of the current frequency area and the information about the candidate tonal components arranged based on the energy information or the amplitude information.

After the candidate tonal components are arranged in ascending or descending order of the energy information or the amplitude information, quantity screening processing is performed on the information about the candidate tonal components arranged based on the energy information or the amplitude information that is obtained in step C11. The information about the maximum quantity of codable tonal components of the current frequency area refers to a maximum quantity of tonal components of the current frequency area that are able to be used for coding. The information about the maximum quantity of codable tonal components of the current frequency area may be set to a preset second value, or may be obtained through selection based on a coding rate. Information about a quantity-screened candidate tonal component of the current frequency area is obtained by performing quantity screening based on the information about the maximum quantity of codable tonal components of the current frequency area and the information about the candidate tonal components arranged based on the energy information or the amplitude information. In this case, the information about the quantity-screened candidate tonal component of the current frequency area is the information about the target tonal component of the current frequency area.

In some embodiments of this application, step 702 of obtaining the information about the target tonal component of the current frequency area based on the information about the combination-processed candidate tonal component of the current frequency area includes the following steps.

D1: Obtain information about a quantity-screened candidate tonal component of the current frequency area based on the information about the combination-processed candidate tonal component of the current frequency area and information about a maximum quantity of codable tonal components of the current frequency area.

Tonal component screening may include quantity screening processing. The audio coding apparatus may perform, based on the information about the maximum quantity of codable tonal components of the current frequency area, quantity screening processing on the information about the combination-processed candidate tonal component obtained in step 701. The information about the maximum quantity of codable tonal components of the current frequency area refers to a maximum quantity of tonal components of the current frequency area that are able to be used for coding. The information about the maximum quantity of codable tonal components of the current frequency area may be set to a preset second value, or may be obtained through selection based on a coding rate.

D2: Obtain the information about the target tonal component of the current frequency area based on the information about the quantity-screened candidate tonal component of the current frequency area.

In this embodiment of this application, the audio coding apparatus performs, based on the information about the maximum quantity of codable tonal components of the current frequency area, quantity screening processing on the information about the combination-processed candidate tonal component to obtain the information about the quantity-screened candidate tonal component of the current frequency area. Performing quantity screening processing can reduce a quantity of candidate tonal components of the current frequency area, and further improve audio signal coding efficiency.

Further, in some embodiments of this application, step D1 of obtaining information about a quantity-screened candidate tonal component of the current frequency area of the current frame based on the information about the combination-processed candidate tonal component of the current frequency area and information about a maximum quantity of codable tonal components of the current frequency area includes:

D11: Arrange combination-processed candidate tonal components of the current frequency area based on energy information or amplitude information of the combination-processed candidate tonal components of the current frequency area, to obtain information about the candidate tonal components arranged based on the energy information or the amplitude information.

Before performing quantity screening processing, the audio coding apparatus may arrange, based on the information about combination-processed candidate tonal components, the combination-processed candidate tonal components in order of the energy information or the amplitude information, to obtain the information about the candidate tonal components arranged based on the energy information or the amplitude information.

D12: Obtain the information about the quantity-screened candidate tonal components of the current frequency area of the current frame based on the information about the maximum quantity of codable tonal components of the current frequency area and the information about the candidate tonal components arranged based on the energy information or the amplitude information.

The audio coding apparatus may perform quantity screening processing on the information about the candidate tonal components arranged based on the energy information or the amplitude information that is obtained in step D11, and further needs to obtain the information about the maximum quantity of codable tonal components of the current frequency area when performing quantity screening processing. The information about the maximum quantity of codable tonal components of the current frequency area refers to a maximum quantity of tonal components of the current frequency area that are able to be used for coding. The information about the maximum quantity of codable tonal components of the current frequency area may be set to a preset second value, or may be obtained through selection based on a coding rate.

Further, determining quantity information, location information, and amplitude information or energy information of quantity-screened tonal components of the current frequency area based on quantity information, location information, and energy information or amplitude information of the candidate tonal components of the current frequency area and the information about the maximum quantity of codable tonal components of the current frequency area may be selecting X candidate tonal components with maximum energy information or maximum amplitude information from the candidate tonal components of the current frequency area that are arranged based on the energy information or the amplitude information. Location information and energy information or amplitude information corresponding to the X candidate tonal components are used as location information and energy information or amplitude information of the quantity-screened tonal component of the current frequency area. X is the quantity information of the quantity-screened tonal components of the current frequency area, and X is less than or equal to the information about the maximum quantity of codable tonal components of the current frequency area.

In some embodiments of this application, step D2 of obtaining the information about the target tonal component of the current frequency area based on the information about the quantity-screened candidate tonal component of the current frequency area includes:

D21: Arrange, based on location information of quantity-screened candidate tonal components of the current frequency area of the current frame, the quantity-screened candidate tonal components of the current frequency area of the current frame in ascending or descending order of locations, to obtain the location-arranged quantity-screened candidate tonal components of the current frequency area of the current frame.

Further, the audio coding apparatus first arranges the quantity-screened candidate tonal components of the current frequency area of the current frame in ascending or descending order of locations, to obtain the location-arranged quantity-screened candidate tonal components of the current frequency area of the current frame.

D22: Obtain, based on the location-arranged quantity-screened candidate tonal components of the current frequency area of the current frame, subband sequence numbers corresponding to the location-arranged quantity-screened candidate tonal components of the current frequency area of the current frame.

The audio coding apparatus may obtain the subband sequence numbers corresponding to the location-arranged quantity-screened candidate tonal components of the current frequency area of the current frame. A subband sequence number is determined based on location information of a candidate tonal component and a subband width of a current frequency area. The subband width of the current frequency area may be a preset value, or may be adaptively selected based on different frequency areas. The subband width may be a quantity of frequency bins included in a subband. Subband widths of different frequency areas may be different.

D23: Obtain subband sequence numbers corresponding to location-arranged quantity-screened candidate tonal components of a current frequency area of a previous frame of the current frame.

The audio coding apparatus may obtain the subband sequence numbers corresponding to the location-arranged quantity-screened candidate tonal components of the current frequency area of the previous frame of the current frame. A subband sequence number is determined based on location information of a candidate tonal component and a subband width of a current frequency area. The subband width of the current frequency area may be a preset value, or may be adaptively selected based on different frequency areas. A previous frame of a current frame is a frame located before a location of the current frame. For example, the previous frame may be an $(m-1)^{th}$ frame if the current frame is an $m^{th}$ frame, where a value of m is an integer greater than or equal to 0.

D24: Refine location information of a location-arranged quantity-screened $n^{th}$ candidate tonal component of the current frequency area of the current frame if the location information of the location-arranged quantity-screened $n^{th}$ candidate tonal component of the current frequency area of the current frame and location information of a location-arranged quantity-screened $n^{th}$ candidate tonal component of the current frequency area of the previous frame meet a preset condition, and a subband sequence number corresponding to the location-arranged quantity-screened $n^{th}$ candidate tonal component of the current frequency area of the current frame is different from a subband sequence number corresponding to the location-arranged quantity-screened $n^{th}$ candidate tonal component of the current frequency area of the previous frame, to obtain the information about the target tonal component of the current frequency area, where the $n^{th}$ candidate tonal component is any one of the location-arranged quantity-screened candidate tonal components of the current frequency area.

The audio coding apparatus may perform determining on location information of candidate tonal components of the current frame and the previous frame to determine whether to refine the location information of the candidate tonal components of the current frame, and set the preset condition. For example, descriptions are provided by using an example of the $n^{th}$ candidate tonal components of the current frame and the previous frame. The location information of the location-arranged quantity-screened $n^{th}$ candidate tonal component of the current frequency area of the current frame is refined if the location information of the location-arranged quantity-screened $n^{th}$ candidate tonal component of the current frequency area of the current frame and the location information of the location-arranged quantity-screened $n^{th}$ candidate tonal component of the current frequency area of the previous frame meet the preset condition, and the subband sequence number corresponding to the location-arranged quantity-screened $n^{th}$ candidate tonal component of the current frequency area of the current frame is different from the subband sequence number corresponding to the location-arranged quantity-screened $n^{th}$ candidate tonal component of the current frequency area of the previous frame, to obtain the information about the target tonal component of the current frequency area, where the $n^{th}$ candidate tonal component is any one of the location-arranged quantity-screened candidate tonal components of the current frequency area. For example, n may be an integer greater than or equal to 0.

Further, the information about the target tonal component of the current frequency area may be directly obtained by refining the location information of the location-arranged quantity-screened $n^{th}$ candidate tonal component of the current frequency area of the current frame in step D24. Alternatively, information about a refined candidate tonal component of the current frequency area is obtained by refining the location information of the location-arranged quantity-screened $n^{th}$ candidate tonal component of the current frequency area of the current frame, and then the information about the target tonal component of the current frequency area is obtained based on the information about the refined candidate tonal component. For example, weighted adjustment is performed on amplitude information or energy information of the refined candidate tonal component of the current frequency area based on the obtained information about the target tonal component of the current frequency area, to obtain the information about the target tonal component of the current frequency area.

In some embodiments of this application, the preset condition includes: A difference between the location information of the location-arranged quantity-screened $n^{th}$ candidate tonal component of the current frequency area of the current frame and the location information of the location-arranged quantity-screened $n^{th}$ candidate tonal component of the current frequency area of the previous frame is less than or equal to a preset threshold.

A value of the preset threshold is not limited. In this embodiment of this application, the preset condition is set in a plurality of implementations. The foregoing example is merely an optional solution. Another preset condition may be further set based on the foregoing preset condition. For example, a ratio of location information of an $n^{th}$ candidate tonal component of the current frequency area of the current frame to location information of an $n^{th}$ candidate tonal component of the current frequency area of the previous frame is less than or equal to another preset threshold, and a manner of setting another preset threshold is not limited.

In some embodiments of this application, the refining location information of a location-arranged quantity-screened $n^{th}$ candidate tonal component of the current frequency area of the current frame includes: refining the location information of the location-arranged quantity-screened $n^{th}$ candidate tonal component of the current frequency area of the current frame to the location information of the location-arranged quantity-screened $n^{th}$ candidate tonal component of the current frequency area of the previous frame.

For example, the location information of the $n^{th}$ candidate tonal component of the current frame of the frequency area is refined. Specifically, the location information of the $n^{th}$ candidate tonal component of the current frequency area of the current frame may be refined to be the same as that of the $n^{th}$ candidate tonal component of the current frequency area of the previous frame. The quantity information, the location information, and the amplitude information or the energy information of the target tonal component of the current frequency area is determined based on the quantity information, the location information, and the energy information or the amplitude information of the refined candidate tonal component.

In this embodiment of this application, after performing inter-frame continuity refining processing in step D24, the audio coding apparatus may obtain the information about the target tonal component of the current frequency area. Continuity of tonal components between adjacent frames and subband distribution of tonal components are considered in inter-frame continuity refining processing. In this way, better tonal component coding effect is obtained by efficiently using a limited quantity of coded bits, and coding quality is improved.

It can be learned from the example descriptions of this application in the foregoing embodiments that, in this embodiment of this application, the coding process includes tonal component screening on the information about the candidate tonal component, and tonal component screening may include at least one of combination processing, inter-frame continuity refining processing, and quantity screening. The coding parameter may be generated based on a tonal-component-screened high frequency band signal, the coding parameter indicates the target tonal component obtained after tonal component screening, bitstream multiplexing may be performed on the coding parameter to obtain the coded bitstream, and the information about the target tonal component that is carried in the coded bitstream and that is obtained in this embodiment of this application has undergone tonal component screening. Therefore, better tonal component coding effect can be efficiently obtained by using a limited quantity of coded bits, and audio signal coding quality can be improved.

In some embodiments of this application, the current frequency area includes at least one subband, and the at least one subband includes a current subband. When performing tonal component screening, the audio coding apparatus may not perform step 701 or step 702, but perform combination processing by using the following step E1. Further, step 503 or step 604 in the foregoing embodiment of performing tonal component screening on the information about the candidate tonal component of the current frequency area to obtain information about a target tonal component of the current frequency area includes:

E1: Perform combination processing on candidate tonal components with a same subband sequence number in the current frequency area to obtain the information about the target tonal component of the current frequency area.

The audio coding apparatus may obtain subband sequence numbers corresponding to all candidate tonal components of the current frequency area, and perform combination processing on candidate tonal components with a same subband sequence number in the current frequency area. For example, two candidate tonal components of the current frequency area may be combined into one combined candidate tonal component of the current frequency area if subband sequence numbers of the two candidate tonal components are the same. The information about the target tonal component of the current frequency area is obtained by performing combination processing in the current frequency area.

In some embodiments of this application, the at least one subband includes a current subband, and a target tonal component of the current subband may be one candidate tonal component in candidate tonal components of the current subband. Further, location information of the target tonal component of the current subband includes location information of the one candidate tonal component in the candidate tonal components of the current subband, and amplitude information or energy information of the target tonal component of the current subband includes amplitude information or energy information of the one candidate tonal component in the candidate tonal components of the current subband, or amplitude information or energy information of the target tonal component of the current subband is obtained through calculation based on amplitude information or energy information of the candidate tonal components of the current subband. A calculation manner is not limited. For example, a mean value of amplitude information or energy information of a plurality of candidate tonal components of the current subband may be used as the amplitude information or the energy information of the target tonal component of the current subband. For another example, a sum of amplitude information or energy information of a plurality of candidate tonal components of the current subband may be used as amplitude information or energy information of the combination-processed candidate tonal component of the current subband. For another example, a calculation manner may alternatively be performing weighted averaging on amplitude information or energy information of a plurality of candidate tonal components of the current subband. This is not limited herein. In this embodiment of this application, through combination processing, the information about the target tonal component of the current subband may be obtained based on information about the candidate tonal components of the current subband.

Figure 8:
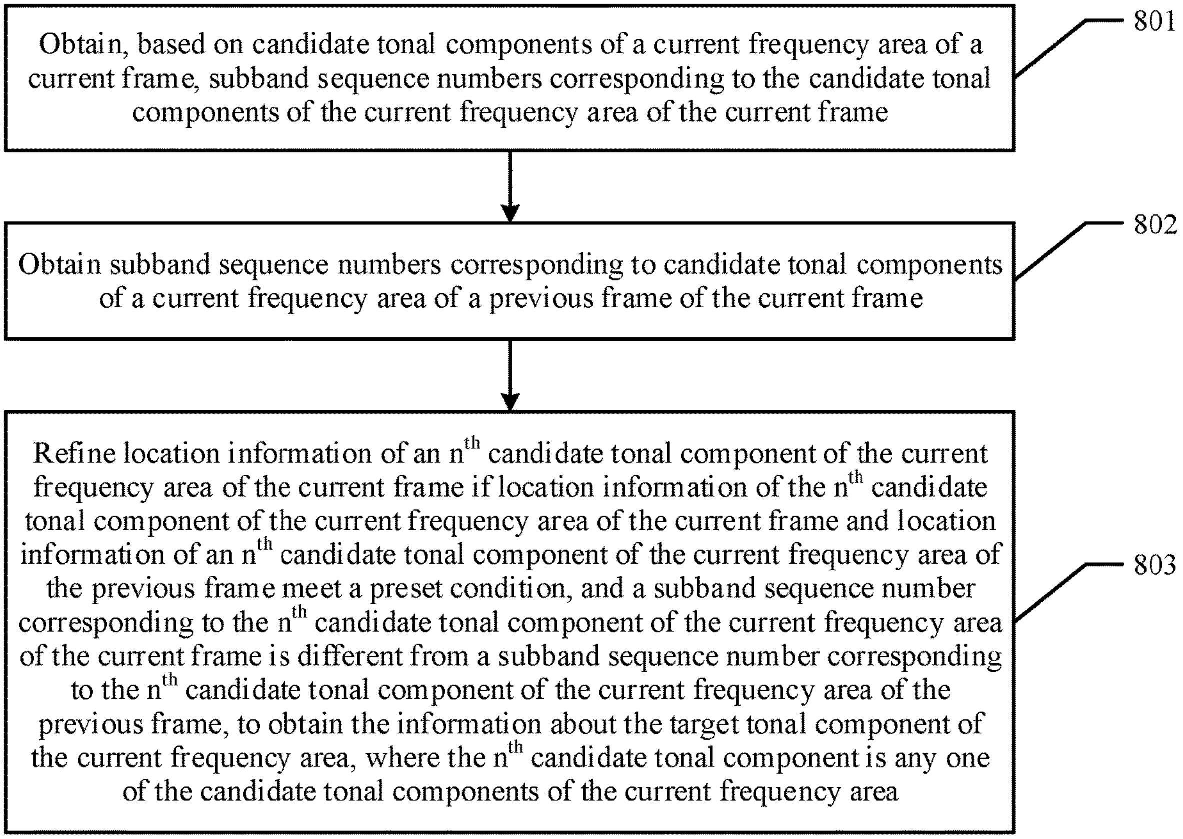
FIG. 8 is a flowchart of another audio coding method according to an embodiment of this application.

In some embodiments of this application, when performing tonal component screening, the audio coding apparatus may not perform step 701 and step 702, but perform tonal component screening by using the following steps. Further, as shown in FIG. 8, descriptions are provided by using an example in which tonal component screening includes inter-frame continuity refining processing. Step 503 or step 604 in the foregoing embodiment of performing, by the audio coding apparatus, tonal component screening on the information about the candidate tonal component of the current frequency area to obtain the information about the target tonal component of the current frequency area includes the following steps.

801: Obtain, based on location information of candidate tonal components of the current frequency area of the current frame, subband sequence numbers corresponding to the candidate tonal components of the current frequency area of the current frame.

In this embodiment of this application, the audio coding apparatus first obtains the subband sequence numbers corresponding to the candidate tonal components of the current frequency area of the current frame, and a subsequent tonal component screening process may be performed by using the subband sequence numbers corresponding to the candidate tonal components.

The audio coding apparatus may obtain subband sequence numbers corresponding to location-arranged candidate tonal components of the current frequency area of the current frame. A subband sequence number is determined based on location information of a candidate tonal component and a subband width of a current frequency area. The subband width of the current frequency area may be a preset value, or may be adaptively selected based on different frequency areas. The subband width may be a quantity of frequency bins included in a subband. Subband widths of different frequency areas may be different.

Further, in some embodiments of this application, step 801 of obtaining, based on location information of candidate tonal components of the current frequency area of the current frame, subband sequence numbers corresponding to the candidate tonal components of the current frequency area of the current frame includes:

F1: Arrange, based on the location information of the candidate tonal components of the current frequency area of the current frame, the candidate tonal components of the current frequency area of the current frame in ascending or descending order of locations, to obtain the location-arranged candidate tonal components of the current frequency area of the current frame.

Further, the audio coding apparatus obtains the location information of the candidate tonal components of the current frequency area of the current frame, and then arranges the candidate tonal components of the current frequency area in ascending or descending order of locations, to obtain the location-arranged candidate tonal components of the current frequency area of the current frame.

F2: Obtain, based on the location-arranged candidate tonal components of the current frequency area, subband sequence numbers corresponding to the candidate tonal components of the current frequency area of the current frame.

After completing location arrangement, the audio coding apparatus determines the location-arranged candidate tonal components of the current frequency area. The subband sequence numbers corresponding to the candidate tonal components of the current frequency area of the current frame may be quickly obtained because location arrangement is performed in step F1.

802: Obtain subband sequence numbers corresponding to candidate tonal components of a current frequency area of a previous frame of the current frame.

The audio coding apparatus may obtain the subband sequence numbers corresponding to the location-arranged candidate tonal components of the current frequency area of the previous frame of the current frame. A subband sequence number is determined based on location information of a candidate tonal component and a subband width of a current frequency area. The subband width of the current frequency area may be a preset value, or may be adaptively selected based on different frequency areas. A previous frame of a current frame is a frame located before a location of the current frame. For example, the previous frame may be an $(m-1)^{th}$ frame if the current frame is an $m^{th}$ frame, where a value of m is an integer greater than or equal to 0.

803: Refine location information of an $n^{th}$ candidate tonal component of the current frequency area of the current frame if the location information of the $n^{th}$ candidate tonal component of the current frequency area of the current frame and location information of an $n^{th}$ candidate tonal component of the current frequency area of the previous frame meet a preset condition, and a subband sequence number corresponding to the $n^{th}$ candidate tonal component of the current frequency area of the current frame is different from a subband sequence number corresponding to the $n^{th}$ candidate tonal component of the current frequency area of the previous frame, to obtain the information about the target tonal component of the current frequency area, where the $n^{th}$ candidate tonal component is any one of the candidate tonal components of the current frequency area.

The audio coding apparatus may perform determining on location information of candidate tonal components of the current frame and the previous frame to determine whether to refine the location information of the candidate tonal components of the current frame, and set the preset condition. For example, descriptions are provided by using an example of the $n^{th}$ candidate tonal components of the current frame and the previous frame. The location information of the location-arranged $n^{th}$ candidate tonal component of the current frequency area of the current frame is refined if the location information of the location-arranged $n^{th}$ candidate tonal component of the current frequency area of the current frame and the location information of the location-arranged $n^{th}$ candidate tonal component of the current frequency area of the previous frame meet the preset condition, and the subband sequence number corresponding to the location-arranged $n^{th}$ candidate tonal component of the current frequency area of the current frame is different from the subband sequence number corresponding to the location-arranged $n^{th}$ candidate tonal component of the current frequency area of the previous frame, to obtain the information about the target tonal component of the current frequency area, where the $n^{th}$ candidate tonal component is any one of the candidate tonal components of the current frequency area. For example, n may be an integer greater than or equal to 0.

In some embodiments of this application, step 803 of refining location information of an $n^{th}$ candidate tonal component of the current frequency area of the current frame includes refining the location information of the $n^{th}$ candidate tonal component of the current frequency area of the current frame to the location information of the $n^{th}$ candidate tonal component of the current frequency area of the previous frame.

For example, the location information of the $n^{th}$ candidate tonal component of the current frame of the frequency area is refined. Further, the location information of the $n^{th}$ candidate tonal component of the current frequency area of the current frame may be refined to be the same as that of the $n^{th}$ candidate tonal component of the current frequency area of the previous frame. The quantity information, the location information, and the amplitude information or the energy information of the target tonal component of the current frequency area is determined based on the quantity information, the location information, and the energy information or the amplitude information of the refined candidate tonal component.

In some embodiments of this application, the preset condition in step 803 includes: A difference between the location information of the $n^{th}$ candidate tonal component of the current frequency area of the current frame and the location information of the $n^{th}$ candidate tonal component of the current frequency area of the previous frame is less than or equal to a preset threshold. A value of the preset threshold is not limited. In this embodiment of this application, the preset condition is set in a plurality of implementations. The foregoing example is merely an optional solution. Another preset condition may be further set based on the foregoing preset condition. For example, a ratio of location information of an $n^{th}$ candidate tonal component of the current frequency area of the current frame to location information of an $n^{th}$ candidate tonal component of the current frequency area of the previous frame is less than or equal to another preset threshold, and a manner of setting another preset threshold is not limited.

Further, the information about the target tonal component of the current frequency area may be directly obtained by refining the location information of the $n^{th}$ candidate tonal component of the current frequency area of the current frame in step 803. Alternatively, information about a refined candidate tonal component of the current frequency area is obtained by refining the location information of the $n^{th}$ candidate tonal component of the current frequency area of the current frame, and then the information about the target tonal component of the current frequency area is obtained based on the information about the refined candidate tonal component.

In this embodiment of this application, the audio coding apparatus obtains the information about the target tonal component of the current frequency area based on the information about the refined candidate tonal component. Continuity of tonal components between adjacent frames and subband distribution of tonal components are considered in inter-frame continuity refining processing. In this way, better tonal component coding effect is obtained by efficiently using a limited quantity of coded bits, and coding quality is improved.

It can be learned from the example descriptions of this application in the foregoing embodiments that, in this embodiment of this application, the coding process includes tonal component screening on the information about the candidate tonal component, and tonal component screening may include inter-frame continuity refining processing. The coding parameter may be generated based on a tonal-component-screened high frequency band signal, the coding parameter indicates the target tonal component obtained after tonal component screening, bitstream multiplexing may be performed on the coding parameter to obtain the coded bitstream, and the information about the target tonal component that is carried in the coded bitstream and that is obtained in this embodiment of this application has undergone tonal component screening. Therefore, better tonal component coding effect can be efficiently obtained by using a limited quantity of coded bits, and audio signal coding quality can be improved.

In some other embodiments of this application, tonal component screening may further include quantity screening processing. The performing, by the audio coding apparatus, tonal component screening on the information about the candidate tonal component of the current frequency area to obtain the information about the target tonal component of the current frequency area includes the following step:

G1: Obtain the information about the target tonal component of the current frequency area based on information about candidate tonal components of the current frequency area and information about a maximum quantity of codable tonal components of the current frequency area.

Tonal component screening may include quantity screening processing. The audio coding apparatus may perform quantity screening processing on the information about the candidate tonal components of the current frequency area. When performing quantity screening processing, the audio coding apparatus further needs to obtain the information about the maximum quantity of codable tonal components of the current frequency area. The information about the maximum quantity of codable tonal components of the current frequency area refers to a maximum quantity of tonal components of the current frequency area that are able to be used for coding.

In some embodiments of this application, the information about the maximum quantity of codable tonal components of the current frequency area includes a preset second value, or the information about the maximum quantity of codable tonal components of the current frequency area is determined based on a coding rate of the current frame.

The information about the maximum quantity of codable tonal components of the current frequency area may be set to a preset second value, that is, a maximum quantity of codable tonal components of each frequency area is fixed. Alternatively, the information about the maximum quantity of codable tonal components of the current frequency area is determined based on a coding rate of the current frame. For example, the coding rate of the current frame is determined, and there is a correspondence between the coding rate of the current frame and the maximum quantity of codable tonal components of the current frequency area. In this case, selection may be performed based on the current coding rate, to obtain the maximum quantity of codable tonal components of the current frequency area.

In some embodiments of this application, step G1 of obtaining the information about the target tonal component of the current frequency area based on information about candidate tonal components of the current frequency area and information about a maximum quantity of codable tonal components of the current frequency area includes:

G11: Select, based on the information about the maximum quantity of codable tonal components of the current frequency area, X candidate tonal components with maximum energy information or maximum amplitude information among the candidate tonal components of the current frequency area, where X is less than or equal to the maximum quantity of codable tonal components of the current frequency area, and X is a positive integer.

The information about the maximum quantity of codable tonal components of the current frequency area refers to a maximum quantity of tonal components of the current frequency area that are able to be used for coding, and the information about the maximum quantity of codable tonal components of the current frequency area may be set to a preset second value, or may be obtained through selection based on a coding rate.

G12: Determine the information about the target tonal component of the current frequency area based on information about the X candidate tonal components, where X represents a quantity of target tonal components of the current frequency area.

The audio coding apparatus may directly use the information about the X candidate tonal components as the information about the target tonal component of the current frequency area, where X represents the quantity of target tonal components of the current frequency area. Alternatively, the information about the target tonal component of the current frequency area is further determined based on the information about the X candidate tonal components. For example, inter-frame continuity refining processing is performed on the information about the X candidate tonal components, and corrected information about the X candidate tonal components is used as the information about the target tonal component of the current frequency area. Alternatively, weighted adjustment is performed on energy information or amplitude information of the X candidate tonal components, and weighted-adjusted information of the X candidate tonal components is used as the information about the target tonal component of the current frequency area.

In the foregoing embodiment, the information about the candidate tonal component includes the amplitude information or the energy information of the candidate tonal component, and the amplitude information or the energy information of the candidate tonal component includes a power spectrum ratio of the candidate tonal component.

The power spectrum ratio of the candidate tonal component is a ratio of a power spectrum value of the candidate tonal component to a mean value of power spectrums of the current frequency area.

In the foregoing embodiment of this application, tonal component screening includes at least one of the following: combination processing, inter-frame continuity refining processing, and quantity screening. There is no limitation on an order of different processing. For example, combination processing may be performed first to obtain quantity information, location information, and amplitude information or energy information of a combined candidate tonal component of the current frequency area. Then, quantity screening processing is performed on the quantity information, the location information, and the amplitude information or the energy information of the combined candidate tonal component of the current frequency area, to obtain quantity information, location information, and amplitude information or energy information of a quantity-screened candidate tonal component of the current frequency area. Finally, inter-frame continuity refining processing is performed based on the quantity information, the location information, and the amplitude information or the energy information of the quantity-screened candidate tonal component, to obtain quantity information, location information, and amplitude information or energy information of a corrected candidate tonal component of the current frequency area as a tonal component screening result.

The following provides detailed descriptions by using a specific application scenario. A high frequency band corresponding to a high frequency band signal includes at least one frequency area, and a frequency area includes at least one subband. Therefore, a current frequency area includes at least one subband. A specific embodiment of obtaining quantity information, location information, and amplitude information or energy information of a target tonal component of a current frequency area based on quantity information, location information, and amplitude information or energy information of a candidate tonal component of the current frequency area includes the following steps.

Step 1: Arrange location information and amplitude information or energy information of candidate tonal components in ascending order of frequency bins, to obtain a sequence of the candidate tonal components with ascending frequency bin sequence numbers.

The amplitude information or the energy information of the candidate tonal components includes a power spectrum ratio of the candidate tonal components.

The sequence of the candidate tonal components with ascending frequency bin sequence numbers includes location information peak_idx and power spectrum ratio information peak_val that are arranged in ascending order of frequency bins.

Step 2: Combine candidate tonal components with a same subband.

In a reconstruction algorithm on a decoder side, each subband includes only one tonal component, and the tonal component is placed in the middle of the subband. Therefore, if an encoder side detects a plurality of tonal components in a subband, combination processing needs to be performed on information about the plurality of tonal components before encoding and transmission.

Combination processing is performed on the location information and the power spectrum ratio information that are arranged in ascending order of frequency bins:

Subband sequence numbers of two candidate tonal components with adjacent frequency bins are calculated as follows:

$$band\_idx\_1=peak\_idx[i]/tone\_res[p], i\in[1, peak\_cnt-1],$$

$$band\_idx\_2=peak\_idx[i-1]/tone\_res[p], i\in[1, peak\_cnt-1].$$

peak_idx[i] and peak_idx[i−1] are location information of an $i^{th}$ candidate tonal component and location information of an $(i-1)^{th}$ candidate tonal component respectively, band_idx_1 and band_idx_2 are a subband sequence number corresponding to the $i^{th}$ candidate tonal component and a subband sequence number corresponding to the $(i-1)^{th}$ candidate tonal component respectively, and tone_res[p] is a subband width of a $p^{th}$ frequency area (tile). In this embodiment of this application, a subband may include 16 frequency bins. To be specific, in a sampling rate of 48 kHz and a 2048-point modified discrete cosine transform (MDCT) transform condition, a subband width is 375 Hz.

When band_idx_1 is the same as band_idx_2, it is determined that the $i^{th}$ candidate tonal component and the $(i-1)^{th}$ candidate tonal component are located in a same subband, and combination processing needs to be performed.

An example of a combination algorithm is as follows: A power spectrum ratio of the $i^{t}$h candidate tonal component is combined into the $(i-1)^{th}$ candidate tonal component, and power spectrum ratio information and location information of the $i^{th}$ candidate tonal component are set to 0. Example descriptions are as follows:

$$peak\_val[i-1]=peak\_val[i-1]+peak\_val[i],$$

$$peak\_val[i]=0, peak\_idx[i]=0.$$

After the $i^{th}$ candidate tonal component and the $(i-1)^{th}$ candidate tonal component are combined, information about an $(i+1)^{th}$ candidate tonal component to a $(peak\_cnt-1)^{th}$ candidate tonal component (arrangement starts from 0) is moved forward, and peak_cnt is decreased by 1.

After the foregoing combination processing, a quantity of finally obtained candidate tonal components is denoted as peak_cnt_refine, updated location information peak_idx and updated power spectrum ratio information peak_val are used as location information and amplitude information or energy information of a combined candidate tonal component of the current frequency area.

Step 3: Rearrange the sequence of the candidate tonal components in descending order of power spectrum ratios.

The sequence of the candidate tonal components includes the updated location information peak_idx and the updated power spectrum ratio information peak_val that are obtained in step 2.

Step 4: Set information about candidate tonal components whose quantity exceeds a specific quantity to 0, and retain only first MAX_TONEPERTILE candidate tonal components with a maximum power spectrum ratio, that is, perform quantity screening processing. In this embodiment of this application, MAX_TONEPERTILE is set to 3.

There is no need to set the power spectrum ratio information and the location information of the $i^{th}$ candidate tonal component to 0 if peak_cnt_refine obtained in step 2 is less than or equal to MAX_TONEPERTILE.

Quantity information of the candidate tonal components retained in step 4 is used as quantity information of a quantity-screened candidate tonal component, location information of the candidate tonal components retained in step 4 is used as location information of the quantity-screened candidate tonal components, and a power spectrum ratio of the candidate tonal components retained in step 4 is used as amplitude information or energy information of the quantity-screened candidate tonal component.

Step 5: Rearrange the sequence of the candidate tonal components in ascending order of frequency bins.

The sequence of the candidate tonal components includes the location information peak_idx of the quantity-screened candidate tonal component and the power spectrum ratio information peak_val of the quantity-screened candidate tonal component that are obtained in step 4.

Step 6: Detect a tonal component at an edge of a subband to ensure continuity of reconstruction on the decoder side.

Some candidate tonal components may be located at edges of subbands, and location information of the candidate tonal components may not belong to a same subband in consecutive frames. Therefore, the candidate tonal components located at the edges of subbands need to be grouped into a same subband. If locations of the candidate tonal components are determined as belonging to different subbands, discontinuity and frequency jump occur when the decoder side reconstructs tonal components.

Detecting and correcting a candidate tonal component at an edge of a subband edge is also referred to as inter-frame continuity refining processing. A specific algorithm is described as follows:

If location information of a candidate tonal component of a current frame and location information of a candidate tonal component of a previous frame are peak_idx and last_peak_idx respectively, a subband sequence number of an $i^{th}$ candidate tonal component of the current frame and a subband sequence number of an $i^{th}$ candidate tonal component of the previous frame are calculated respectively:

$$\text{band\_idx\_cur}=\text{peak\_idx}[i]/\text{tone\_res}[p],$$

$$\text{band\_idx\_last}=\text{last\_peak\_idx}[i]/\text{tone\_res}[p].$$

peak_idx of the current frame is corrected when the following conditions are met:

$$|\text{peak\_idx}[i]-\text{last\_peak\_idx}[i]|==1\ \&\ \text{band\_idx\_cur}!=\text{band\_idx\_last}.$$

When a difference between a location of the $i^{th}$ candidate tonal component of the current frame and a location of the $i^{th}$ candidate tonal component of the previous frame is 1, and the locations belong to different subbands, location information peak_idx of the current frame is corrected. A specific processing procedure of correction is as follows:

$$\text{peak\_idx}[i]=\text{last\_peak\_idx}[i].$$

The location information of the candidate tonal component of the previous frame needs to be updated after inter-frame continuity refining processing. That is, last_peak_idx is updated to peak_idx.

Quantity information of a tonal component may be obtained after tonal component screening. In this specific embodiment, a quantity of tonal components of the current tile is denoted as tone_cnt[p]:

$$\text{tone\_cnt}[p]=\text{peak\_cnt\_refine}.$$

Amplitude information or energy information of the tonal component may be obtained after tonal component screening. In this embodiment of this application, the energy information of the tonal component is represented as equivalent MDCT spectral energy, and a calculation method is as follows.

$$\text{toneEnergy}R[i]=\text{mean\_powerspec}R*(\text{powerSpectrum}[\text{index}]/\text{mean\_powerspec}).$$

mean_powerspecR is a mean MDCT energy value of the current tile, mean_powerspec is a mean power spectrum value of the current tile, powerSpectrum[index] is a power spectrum of an $i^{th}$ tonal component, index is a frequency bin location of the $i^{th}$ tonal component, and toneEnergyR[i] is equivalent MDCT energy of the $i^{th}$ tonal component.

The mean MDCT energy value mean_powerspecR of the current tile is calculated as follows.

$$\text{mean\_powerspec}R=\frac{1}{\text{tile\_width}}\sum_{sb} mdct\ \text{Spectrum}^2[sb].$$

mdctSpectrum is a signal MDCT spectrum, tile width is a tile width (that is, a quantity of frequency bins), and mean_powerspecR is a mean MDCT energy value.

Finally, a location-quantity parameter of a tonal component of the current frequency area and an amplitude parameter or an energy parameter of the tonal component are determined based on quantity information of the tonal component of the current frequency area, location information of the tonal component, and amplitude information or energy information of the tonal component.

It can be learned from the foregoing example descriptions that, in tonal component screening provided in this embodiment of this application, not only energy or an amplitude of a tonal component and a maximum quantity of tonal components able to be used for coding but also continuity of tonal components between adjacent frames and subband distribution of tonal components are considered. In this way, better tonal component coding effect is obtained by efficiently using a limited quantity of coded bits, and coding quality is improved.

Figure 9:
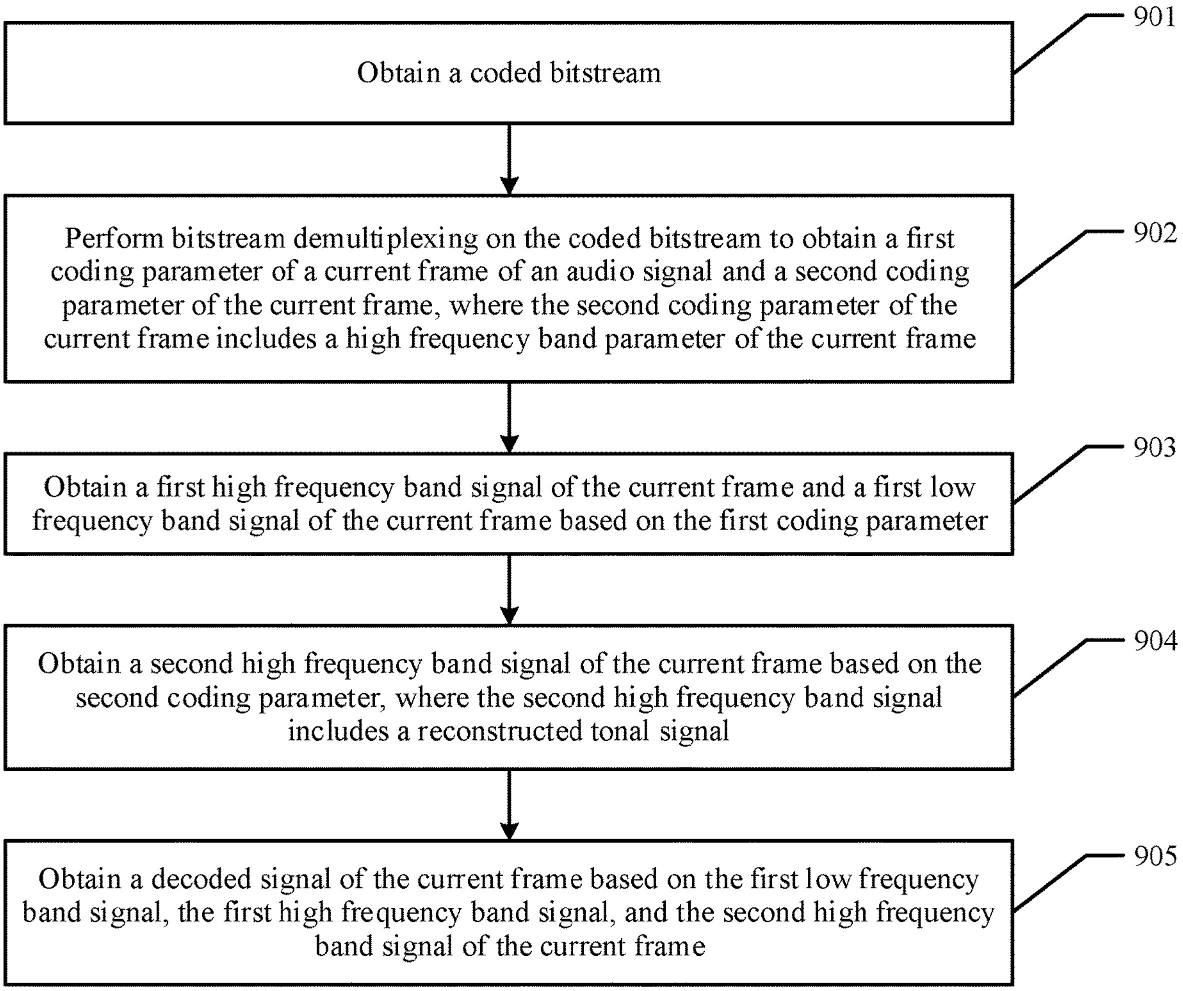
FIG. 9 is a flowchart of an audio decoding method according to an embodiment of this application.

The audio coding method performed by the audio coding apparatus is described in the foregoing embodiment. The following describes an audio decoding method performed by an audio decoding apparatus provided in an embodiment of this application. As shown in FIG. 9, the method mainly includes the following steps.

901: Obtain a coded bitstream.

The coded bitstream is sent by the audio coding apparatus to the audio decoding apparatus.

902: Perform bitstream demultiplexing on the coded bitstream to obtain a first coding parameter of a current frame of an audio signal and a second coding parameter of the current frame, where the second coding parameter of the current frame includes a high frequency band parameter of the current frame.

For the first coding parameter and the second coding parameter, refer to the coding method. Details are not described herein again.

903: Obtain a first high frequency band signal of the current frame and a first low frequency band signal of the current frame based on the first coding parameter.

The first high frequency band signal may include at least one of a decoded high frequency band signal obtained through direct decoding based on the first coding parameter, and an extended high frequency band signal obtained through bandwidth extension based on the first low frequency band signal.

904: Obtain a second high frequency band signal of the current frame based on the second coding parameter, where the second high frequency band signal includes a reconstructed tonal signal.

The second coding parameter includes the high frequency band parameter of the current frame. The high frequency band parameter may include information about a tonal component of the high frequency band signal. For example, the high frequency band parameter of the current frame includes a location-quantity parameter of a tonal component, and an amplitude parameter or an energy parameter of the tonal component. For another example, the high frequency band parameter of the current frame includes a location parameter and a quantity parameter of a tonal component, and an amplitude parameter or an energy parameter of the tonal component. For the high frequency band parameter of the current frame, refer to the coding method. Details are not described herein again.

Similar to a processing procedure on an encoder side, in a processing procedure on a decoder side, a process of obtaining a reconstructed high frequency band signal of the current frame based on the high frequency band parameter is also performed based on division into frequency areas and/or division into subbands of a high frequency band. A high frequency band corresponding to the high frequency band signal includes at least one frequency area, and one of such frequency area includes at least one subband. A quantity of frequency areas of the high frequency band parameter that needs to be determined may be given in advance, or may be obtained from a bitstream. Herein, descriptions are further provided by using an example in which a reconstructed high frequency band signal of a current frame is obtained in a frequency area based on a location-quantity parameter of a tonal component and an amplitude parameter of the tonal component. Details may be as follows: determining a location of the tonal component of the current frequency area based on the location-quantity parameter of the tonal component of the current frequency area; determining, based on the amplitude parameter or the energy parameter of the tonal component of the current frequency area, amplitude or energy corresponding to the location of the tonal component; obtaining the reconstructed tonal signal based on the location of the tonal component of the current frequency area and the amplitude or the energy corresponding to the location of the tonal component; and obtaining the reconstructed high frequency band signal based on the reconstructed tonal signal.

905: Obtain a decoded signal of the current frame based on the first low frequency band signal, the first high frequency band signal, and the second high frequency band signal of the current frame.

In this embodiment of this application, tonal component selection and the coding method are performed on the encoder side, and not only energy or an amplitude of a peak value and a maximum quantity of tonal components able to be used for coding but also continuity of tonal components between adjacent frames and subband distribution of tonal components are considered. In this way, better tonal component coding effect is obtained by efficiently using a limited quantity of coded bits, and coding quality is improved. On the corresponding decoder side, a to-be-decoded high frequency band signal has undergone tonal component screening, and therefore decoding efficiency is correspondingly improved.

It should be noted that, for brief description, the foregoing method embodiments are represented as a series of action combinations. However, a person skilled in the art should appreciate that this application is not limited to the described action sequence, because some steps may be performed in another sequence or simultaneously according to this application. It should be further appreciated by a person skilled in the art that embodiments described in this specification all belong to example embodiments, and the actions and modules are not necessarily required by this application.

To better implement the solutions of embodiments of this application, related apparatuses for implementing the solutions are further provided below.

Figure 10:
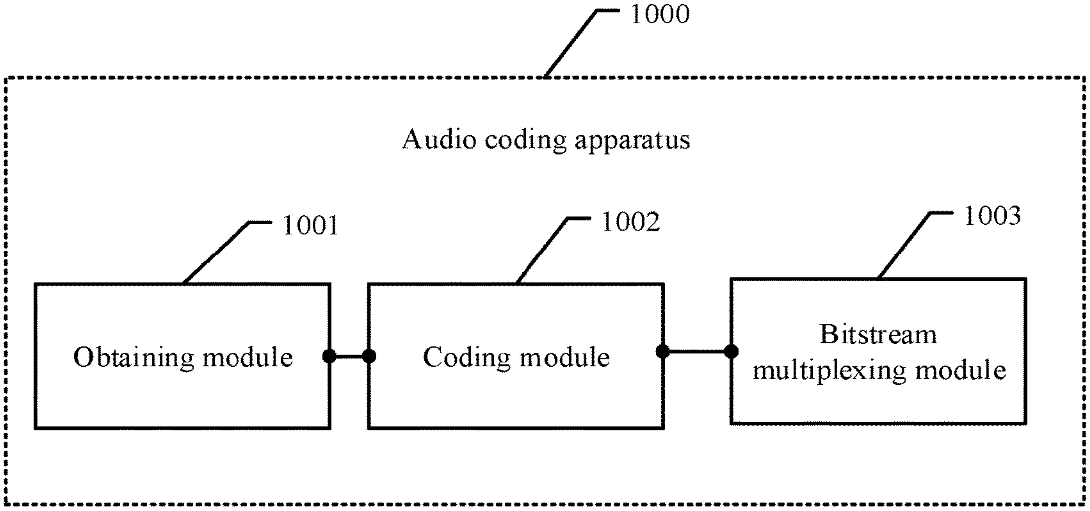
FIG. 10 is a schematic diagram of an audio coding apparatus according to an embodiment of this application.

Refer to FIG. 10. An audio encoding apparatus 1000 provided in an embodiment of this application may include an obtaining module 1001, a coding module 1002, and a bitstream multiplexing module 1003.

The obtaining module is configured to obtain a current frame of an audio signal. The current frame includes a high frequency band signal.

The coding module is configured to code the high frequency band signal to obtain a coding parameter of the current frame. Coding includes tonal component screening, the coding parameter indicates information about a target tonal component of the high frequency band signal, the target tonal component is obtained after tonal component screening, and information about a tonal component includes location information, quantity information, and amplitude information or energy information of the tonal component.

The bitstream multiplexing module is configured to perform bitstream multiplexing on the coding parameter to obtain a coded bitstream.

In some embodiments of this application, a high frequency band corresponding to the high frequency band signal includes at least one frequency area, and the at least one frequency area includes a current frequency area.

The coding module is configured to: obtain information about a candidate tonal component of the current frequency area based on a high frequency band signal of the current frequency area; perform tonal component screening on the information about the candidate tonal component of the current frequency area to obtain information about a target tonal component of the current frequency area; and obtain a coding parameter of the current frequency area based on the information about the target tonal component of the current frequency area.

In some embodiments of this application, a high frequency band corresponding to the high frequency band signal includes at least one frequency area, and the at least one frequency area includes a current frequency area.

The coding module is configured to perform peak search based on a high frequency band signal of the current frequency area, to obtain information about a peak in the current frequency area, where the information about the peak in the current frequency area includes quantity information of the peak, location information of the peak, and energy information of the peak or amplitude information of the peak in the current frequency area; perform peak screening on the information about the peak in the current frequency area to obtain information about a candidate tonal component of the current frequency area; perform tonal component screening on the information about the candidate tonal component of the current frequency area to obtain information about a target tonal component of the current frequency area; and obtain a coding parameter of the current frequency area based on the information about the target tonal component of the current frequency area.

In some embodiments of this application, the current frequency area includes at least one subband, and the at least one subband includes a current subband.

The coding module is configured to perform combination processing on candidate tonal components with a same subband sequence number in the current frequency area, to obtain information about a combination-processed candidate tonal component; and obtain the information about the target tonal component of the current frequency area based on the information about the combination-processed candidate tonal component of the current frequency area.

In some embodiments of this application, the at least one subband includes a current subband.

The information about the combination-processed candidate tonal component of the current frequency area includes: location information of a combination-processed candidate tonal component of the current subband, and amplitude information or energy information of the combination-processed candidate tonal component of the current subband; the location information of the combination-processed candidate tonal component of the current subband includes location information of one candidate tonal component in candidate tonal components of the current subband that do not undergo combination processing; and the amplitude information or the energy information of the combination-processed candidate tonal component of the current subband includes amplitude information or energy information of the one candidate tonal component, or the amplitude information or the energy information of the combination-processed candidate tonal component of the current subband is obtained through calculation based on amplitude information or energy information of the candidate tonal components of the current subband that do not undergo combination processing.

In some embodiments of this application, the information about the combination-processed candidate tonal component of the current frequency area further includes quantity information of the combination-processed candidate tonal component of the current frequency area; and the quantity information of the combination-processed candidate tonal component of the current frequency area is the same as information about a quantity of subbands having a candidate tonal component in the current frequency area.

In some embodiments of this application, the coding module is configured to: before performing combination processing on the candidate tonal components with the same subband sequence number in the current frequency area, arrange, based on location information of candidate tonal components of the current frequency area, the candidate tonal components of the current frequency area in ascending or descending order of locations to obtain the location-arranged candidate tonal components of the current frequency area; and the coding module is configured to perform combination processing on the candidate tonal components with the same subband sequence number in the current frequency area based on the location-arranged candidate tonal components of the current frequency area.

In some embodiments of this application, the coding module is configured to obtain the information about the target tonal component of the current frequency area based on the information about the combination-processed candidate tonal component of the current frequency area and information about a maximum quantity of codable tonal components of the current frequency area.

In some embodiments of this application, the coding module is configured to arrange combination-processed candidate tonal components of the current frequency area based on energy information or amplitude information of the combination-processed candidate tonal components of the current frequency area, to obtain information about the candidate tonal components arranged based on the energy information or the amplitude information; and obtain the information about the target tonal component of the current frequency area based on the information about the maximum quantity of codable tonal components of the current frequency area and the information about the candidate tonal components arranged based on the energy information or the amplitude information.

In some embodiments of this application, the coding module is configured to obtain information about a quantity-screened candidate tonal component of the current frequency area based on the information about the combination-processed candidate tonal component of the current frequency area and information about a maximum quantity of codable tonal components of the current frequency area; and obtain the information about the target tonal component of the current frequency area based on the information about the quantity-screened candidate tonal component of the current frequency area.

In some embodiments of this application, the coding module is configured to arrange combination-processed candidate tonal components of the current frequency area based on energy information or amplitude information of the combination-processed candidate tonal components of the current frequency area, to obtain information about the candidate tonal components arranged based on the energy information or the amplitude information; and obtain the information about the quantity-screened candidate tonal components of the current frequency area of the current frame based on the information about the maximum quantity of codable tonal components of the current frequency area and the information about the candidate tonal components arranged based on the energy information or the amplitude information.

In some embodiments of this application, the coding module is configured to arrange, based on location information of quantity-screened candidate tonal components of the current frequency area of the current frame, the quantity-screened candidate tonal components of the current frequency area of the current frame in ascending or descending order of locations, to obtain the location-arranged candidate tonal components of the current frequency area of the current frame; obtain, based on the location-arranged candidate tonal components of the current frequency area of the current frame, subband sequence numbers corresponding to the location-arranged quantity-screened candidate tonal components of the current frequency area of the current frame; obtain subband sequence numbers corresponding to location-arranged quantity-screened candidate tonal components of a current frequency area of a previous frame of the current frame; and refine location information of a location-arranged quantity-screened $n^{th}$ candidate tonal component of the current frequency area of the current frame if the location information of the location-arranged quantity-screened $n^{th}$ candidate tonal component of the current frequency area of the current frame and location information of a location-arranged quantity-screened $n^{th}$ candidate tonal component of the current frequency area of the previous frame meet a preset condition, and a subband sequence number corresponding to the location-arranged quantity-screened $n^{th}$ candidate tonal component of the current frequency area of the current frame is different from a subband sequence number corresponding to the location-arranged quantity-screened $n^{th}$ candidate tonal component of the current frequency area of the previous frame, to obtain the information about the target tonal component of the current frequency area, where the $n^{th}$ candidate tonal component is any one of the location-arranged quantity-screened candidate tonal components of the current frequency area.

In some embodiments of this application, the preset condition includes that a difference between the location information of the location-arranged quantity-screened $n^{th}$ candidate tonal component of the current frequency area of the current frame and the location information of the location-arranged quantity-screened $n^{th}$ candidate tonal component of the current frequency area of the previous frame is less than or equal to a preset threshold.

In some embodiments of this application, the coding module is configured to refine the location information of the location-arranged quantity-screened $n^{th}$ candidate tonal component of the current frequency area of the current frame to the location information of the location-arranged quantity-screened $n^{th}$ candidate tonal component of the current frequency area of the previous frame.

In some embodiments of this application, the current frequency area includes at least one subband, and the at least one subband includes a current subband. The coding module is configured to perform combination processing on candidate tonal components with a same subband sequence number in the current frequency area to obtain the information about the target tonal component of the current frequency area.

In some embodiments of this application, the current frequency area includes at least one subband. The coding module is configured to obtain, based on location information of candidate tonal components of the current frequency area of the current frame, subband sequence numbers corresponding to the candidate tonal components of the current frequency area of the current frame; obtain subband sequence numbers corresponding to candidate tonal components of a current frequency area of a previous frame of the current frame; and refine location information of an $n^{th}$ candidate tonal component of the current frequency area of the current frame if the location information of the $n^{th}$ candidate tonal component of the current frequency area of the current frame and location information of an $n^{th}$ candidate tonal component of the current frequency area of the previous frame meet a preset condition, and a subband sequence number corresponding to the $n^{th}$ candidate tonal component of the current frequency area of the current frame is different from a subband sequence number corresponding to the $n^{th}$ candidate tonal component of the current frequency area of the previous frame, to obtain the information about the target tonal component of the current frequency area, where the $n^{th}$ candidate tonal component is any one of the candidate tonal components of the current frequency area.

In some embodiments of this application, the coding module is configured to arrange, based on the location information of the candidate tonal components of the current frequency area of the current frame, the candidate tonal components of the current frequency area of the current frame in ascending or descending order of locations, to obtain the location-arranged candidate tonal components of the current frequency area of the current frame; and obtain, based on the location-arranged candidate tonal components of the current frequency area, subband sequence numbers corresponding to the candidate tonal components of the current frequency area of the current frame.

In some embodiments of this application, the preset condition includes that a difference between the location information of the $n^{th}$ candidate tonal component of the current frequency area of the current frame and the location information of the $n^{th}$ candidate tonal component of the current frequency area of the previous frame is less than or equal to a preset threshold.

In some embodiments of this application, the coding module is configured to refine the location information of the $n^{th}$ candidate tonal component of the current frequency area of the current frame to the location information of the $n^{th}$ candidate tonal component of the current frequency area of the previous frame.

In some embodiments of this application, the coding module is configured to obtain the information about the target tonal component of the current frequency area based on information about candidate tonal components of the current frequency area and information about a maximum quantity of codable tonal components of the current frequency area.

In some embodiments of this application, the coding module is configured to select, based on the information about the maximum quantity of codable tonal components of the current frequency area, X candidate tonal components with maximum energy information or maximum amplitude information among the candidate tonal components of the current frequency area, where X is less than or equal to the maximum quantity of codable tonal components of the current frequency area, and X is a positive integer; and determine information about the X candidate tonal components as the information about the target tonal component of the current frequency area, where X represents a quantity of target tonal components of the current frequency area.

In some embodiments of this application, the information about the candidate tonal component includes amplitude information or energy information of the candidate tonal component, and the amplitude information or the energy information of the candidate tonal component includes a power spectrum ratio of the candidate tonal component, where the power spectrum ratio of the candidate tonal component is a ratio of a power spectrum of the candidate tonal component to a mean value of power spectrums of the current frequency area.

It can be learned from the example description in the foregoing embodiment that the current frame of the audio signal is obtained, the high frequency band signal is coded to obtain the coding parameter of the current frame, and bitstream multiplexing is performed on the coding parameter to obtain the coded bitstream. The current frame includes the high frequency band signal. Coding includes tonal component screening, the coding parameter indicates the information about the target tonal component of the high frequency band signal, the target tonal component is obtained after tonal component screening, and the information about the tonal component includes the location information, the quantity information, and the amplitude information or the energy information of the tonal component. In this embodiment of this application, the coding process includes tonal component screening, the coding parameter indicates the target tonal component obtained after tonal component screening, bitstream multiplexing may be performed on the coding parameter to obtain the coded bitstream, and the information about the target tonal component that is carried in the coded bitstream and that is obtained in this embodiment of this application has undergone tonal component screening. Therefore, better tonal component coding effect can be efficiently obtained by using a limited quantity of coded bits, and audio signal coding quality can be improved.

It should be noted that, content such as information exchange between the modules/units of the apparatus and the execution processes thereof is based on the same idea as the method embodiments of this application, and produces the same technical effects as the method embodiments of this application. For specific content, refer to the foregoing descriptions in the method embodiments of this application. Details are not described herein again.

Based on the same idea as the foregoing methods, an embodiment of this application provides an audio signal encoder. The audio signal encoder is configured to code an audio signal, and includes, for example, the encoder described in one or more of the foregoing embodiments. An audio coding apparatus is configured to perform coding to generate a corresponding bitstream.

Figure 11:
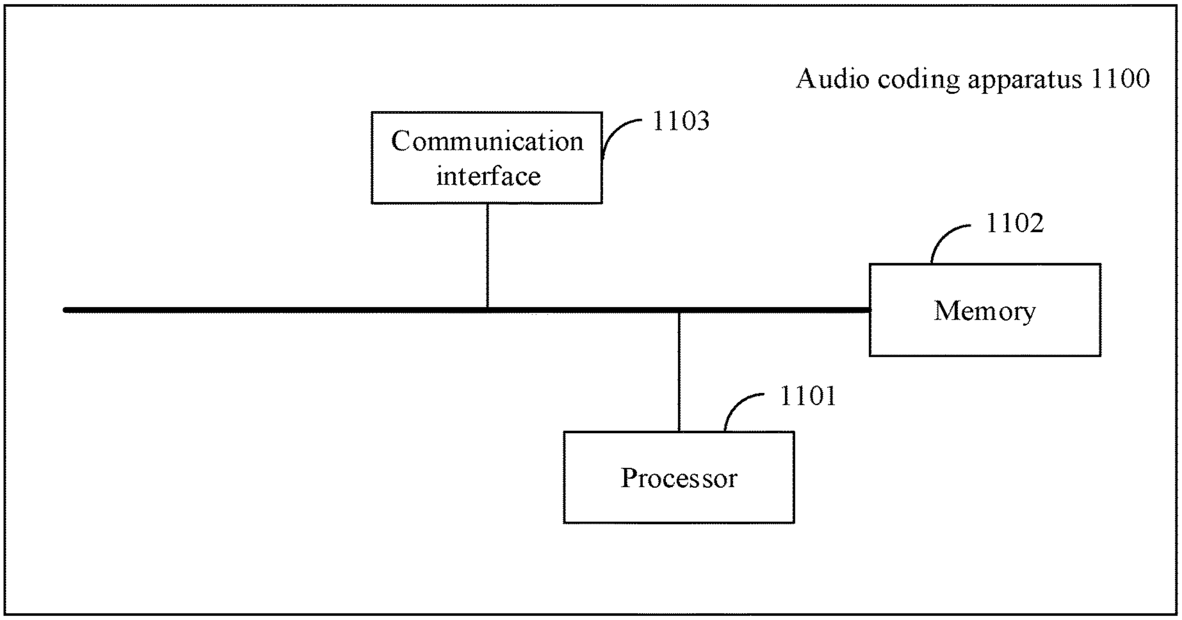
FIG. 11 is a schematic diagram of another audio coding apparatus according to an embodiment of this application.

Based on the same idea as the foregoing method, an embodiment of this application provides an audio signal coding device, for example, an audio coding apparatus. As shown in FIG. 11, the audio coding apparatus 1100 includes: a processor 1101, a memory 1102, and a communication interface 1103 (there may be one or more processors 1101 in the audio coding apparatus 1100, and FIG. 11 uses an example with one processor). In some embodiments of this application, the processor 1101, the memory 1102, and the communication interface 1103 may be connected through a bus or in another manner. FIG. 11 shows an example of connection through a bus.

The memory 1102 may include a read-only memory and a random access memory, and provides instructions and data for the processor 1101. A part of the memory 1102 may further include a non-volatile RAM (NVRAM). The memory 1102 stores an operating system and operation instructions, an executable module or a data structure, a subnet thereof, or an extended set thereof. The operation instructions may include various operation instructions to implement various operations. The operating system may include various system programs, to implement various basic services and process a hardware-based task.

The processor 1101 controls an operation of an audio coding device, and the processor 1101 may also be referred to as a central processing unit (CPU). In specific application, components of the audio coding device are coupled together by using a bus system. In addition to a data bus, the bus system may further include a power bus, a control bus, a status signal bus, and the like. However, for clear description, various types of buses in the figure are marked as the bus system.

The methods disclosed in the foregoing embodiments of this application may be applied to the processor 1101 or implemented by the processor 1101. The processor 1101 may be an integrated circuit chip, and has a signal processing capability. In an implementation process, the steps of the foregoing methods may be completed by using a hardware integrated logic circuit in the processor 1101, or by using instructions in a form of software. The processor 1101 may be a general-purpose processor, a DSP, an ASIC, an FPGA, or another programmable logic device, a discrete gate or transistor logic device, or a discrete hardware component. The processor 1101 may implement or perform the methods, the steps, and logical block diagrams that are disclosed in embodiments of this application. The general-purpose processor may be a microprocessor, or the processor may be any conventional processor or the like. The steps of the methods disclosed with reference to embodiments of this application may be directly executed and accomplished by using a hardware decoding processor, or may be executed and accomplished by using a combination of hardware and software modules in a decoding processor. A software module may be located in a mature storage medium in the art, such as a random access memory, a flash memory, a read-only memory, a programmable read-only memory, an electrically erasable programmable memory, or a register. The storage medium is located in the memory 1102. The processor 1101 reads information in the memory 1102, and completes the steps of the foregoing methods in combination with hardware of the processor 1101.

The communication interface 1103 may be configured to receive or send digit or character information, for example, may be an input/output interface, a pin, or a circuit. For example, the foregoing coded bitstream is sent through the communication interface 1103.

Based on the same idea as the foregoing method, an embodiment of this application provides an audio coding device, including a non-volatile memory and a processor that are coupled to each other. The processor invokes program code stored in the memory to perform a part or all of the steps of the audio signal coding method in one or more of the foregoing embodiments.

Based on the same idea as the foregoing method, an embodiment of this application provides a computer-readable storage medium. The computer-readable storage medium stores program code, and the program code includes instructions for performing a part or all of the steps of the audio signal coding method in one or more of the foregoing embodiments.

Based on the same idea as the foregoing method, an embodiment of this application provides a computer program product. When the computer program product runs on a computer, the computer is enabled to perform a part or all of the steps of the audio signal coding method in one or more of the foregoing embodiments.

The processor mentioned in the foregoing embodiments may be an integrated circuit chip, and has a signal processing capability. In an implementation process, steps in the foregoing method embodiments may be implemented by using a hardware integrated logic circuit in the processor, or by using instructions in a form of software. The processor may be a general-purpose processor, a DSP, an ASIC, an FPGA or another programmable logic device, a discrete gate or transistor logic device, or a discrete hardware component. The general-purpose processor may be a microprocessor, or the processor may be any conventional processor or the like. The steps of the methods disclosed in embodiments of this application may be directly executed and accomplished by using a hardware encoding processor, or executed and accomplished by using a combination of hardware and software modules in an encoding processor. A software module may be located in a mature storage medium in the art, such as a random access memory, a flash memory, a read-only memory, a programmable read-only memory, an electrically erasable programmable memory, or a register. The storage medium is located in the memory. A processor reads information in the memory and completes the steps of the foregoing methods in combination with hardware of the processor.

The memory in the foregoing embodiments may be a volatile memory or a non-volatile memory, or may include both a volatile memory and a non-volatile memory. The nonvolatile memory may be a ROM, a programmable ROM (PROM), an erasable PROM (EPROM), EEPROM, or a flash memory. The volatile memory may be a RAM, used as an external cache. Through example but not limitative description, many forms of RAMs may be used, for example, a static RAM (SRAM), a dynamic RAM (DRAM), a synchronous DRAM (SDRAM), a double data rate (DDR) SDRAM, an enhanced SDRAM (ESDRAM), a synchronous link DRAM (SLDRAM), and a direct rambus (DR) DRAM. It should be noted that the memory of the systems and methods described in this specification includes but is not limited to these and any memory of another proper type.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that, the disclosed system, apparatus, and method may be implemented in other manners. For example, the described apparatus embodiments are merely examples. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, may be located in one location, or may be distributed on a plurality of network units. Apart or all of the units may be selected based on actual requirements to achieve the objectives of the solutions of embodiments.

In addition, functional units in embodiments of this application may be integrated into one processing unit, or each of the units may exist alone physically, or two or more units may be integrated into one unit.

When the functions are implemented in the form of a software functional unit and sold or used as an independent product, the functions may be stored in a computer-readable storage medium. Based on such an understanding, the technical solutions in this application essentially, or the part contributing to the conventional technology, or a part of the technical solutions may be implemented in a form of a software product. The computer software product is stored in a storage medium and includes several instructions for instructing a computer device (a personal computer, a server, a network device, or the like) to perform all or a part of the steps of the methods in embodiments of this application. The foregoing storage medium includes any medium that can store program code, such as a universal serial bus (USB) flash drive, a removable hard disk, a ROM, a RAM, a magnetic disk, or an optical disc.

The foregoing descriptions are merely specific implementations of this application, but are not intended to limit the protection scope of this application. Any variation or replacement readily figured out by a person skilled in the art within the technical scope disclosed in embodiments of this application shall fall within the protection scope of this application. Therefore, the protection scope of this application shall be subject to the protection scope of the claims.

What is claimed is:

1. A method comprising:

obtaining a current frame of an audio signal, wherein the current frame comprises a first high frequency band signal;

coding the first high frequency band signal to obtain a coding parameter of the current frame, wherein coding comprises tonal component screening, wherein the coding parameter indicates first information about a target tonal component of the first high frequency band signal, and wherein the first information comprises first location information, first quantity information, and either first amplitude information or first energy information of the tonal component; and performing bitstream multiplexing on the first coding parameter to obtain a coded bitstream.

2. The method of claim 1, wherein a high frequency band corresponding to the first high frequency band signal comprises a frequency area comprising a current frequency area, and wherein coding the first high frequency band signal either comprises:

obtaining second information about a candidate tonal component of the current frequency area based on a second high frequency band signal of the current frequency area;

performing second tonal component screening on the second information to obtain third information about a second target tonal component of the current frequency area; and obtaining a second coding parameter of the current frequency area based on the third information; or wherein coding the first high frequency band signal comprises:

performing peak search based on the second high frequency band signal to obtain fourth information about a peak in the current frequency area, wherein the fourth information comprises second quantity information of the peak, second location information of the peak, and second energy information of the peak or second amplitude information of the peak;

performing peak screening on the fourth information to obtain the second information;

performing tonal component screening on the second information to obtain the third information; and obtaining the second coding parameter based on the third information.

3. The method of claim 2, wherein the current frequency area comprises a subband, and wherein performing the second tonal component screening either comprises performing combination processing on candidate tonal components with a same subband sequence number in the current frequency area to obtain the third information; or wherein performing the second tonal component screening comprises:

obtaining, based on third location information of candidate tonal components of the current frequency area of the current frame, first subband sequence numbers corresponding to the candidate tonal components;

obtaining second subband sequence numbers corresponding to candidate tonal components of a second current frequency area of a previous frame of the current frame; and refining fourth location information of a first $n^{th}$ candidate tonal component of the current frequency area of the current frame to obtain the third information when the fourth location information and fifth location information of a second nth candidate tonal component of the current frequency area of the previous frame meet a preset condition, and a first subband sequence number corresponding to the first nth candidate tonal component is different from a second subband sequence number corresponding to the second nth candidate tonal component.

4. The method of claim 3, wherein obtaining the first subband sequence numbers comprises:

arranging, based on the third location information, the candidate tonal components in ascending or descending order of locations, to obtain location-arranged candidate tonal components of the current frequency area of the current frame; and obtaining, based on the location-arranged candidate tonal components, the first subband sequence numbers corresponding to the candidate tonal components of the current frequency area of the current frame, wherein the preset condition comprises that a difference between the fourth location information and the fifth location information is less than or equal to a preset threshold.

5. The method of claim 3, wherein refining the fourth location information comprises refining the fourth location information to the fifth location information.

6. The method of claim 2, wherein performing the second tonal component screening comprises obtaining the third information based on fifth information about candidate tonal components of the current frequency area and sixth information about a maximum quantity of codable tonal components of the current frequency area.

7. The method of claim 6, wherein obtaining the third information comprises:

selecting, based on the sixth information, X candidate tonal components with maximum energy information or maximum amplitude information among the candidate tonal components, wherein X is less than or equal to the maximum quantity of codable tonal components, and wherein X is a positive integer; and obtaining seventh information about the X candidate tonal components as the third information, wherein X represents a quantity of target tonal components.

8. The method of claim 2, wherein the second information comprises third amplitude information or third energy information of the candidate tonal component, wherein the third amplitude information or the third energy information comprises a power spectrum ratio of the candidate tonal component, wherein the power spectrum ratio is a ratio of a power spectrum of the candidate tonal component to a mean value of power spectrums of the current frequency area.

9. The method of claim 2, wherein the current frequency area comprises a subband, and wherein performing the second tonal component screening comprises:

performing combination processing on candidate tonal components with a same subband sequence number in the current frequency area to obtain fifth information about a first combination-processed candidate tonal component of the current frequency area; and obtaining the third information based on the fifth information.

10. The method of claim 9, wherein the subband comprises a current subband, wherein the fifth information comprises third location information of a second combination-processed candidate tonal component of the current subband and comprises third amplitude information or third energy information of the second combination-processed candidate tonal component, wherein the third location information comprises fourth location information of one candidate tonal component in second candidate tonal components of the current subband that do not undergo combination processing, and wherein:

the third amplitude information or the third energy information comprises fourth amplitude information or fourth energy information of the candidate tonal component, or the third amplitude information or the third energy information is based on fifth amplitude information or fifth energy information of the second candidate tonal components of the current subband that do not undergo combination processing.

11. The method of claim 10, wherein the fifth information further comprises quantity information of the first combination-processed candidate tonal component, and wherein the quantity information is the same as sixth information about a quantity of subbands having the candidate tonal component in the current frequency area.

12. The method of claim 9, wherein before performing the combination processing, the method further comprises arranging, based on fifth location information of candidate tonal components of the current frequency area, the candidate tonal components in ascending or descending order of locations to obtain location-arranged candidate tonal components of the current frequency area, and wherein performing the combination processing comprises further performing the combination processing based on the location-arranged candidate tonal components.

13. The method of claim 9, wherein obtaining the third information comprises:

obtaining the third information based on the fifth information and sixth information about a maximum quantity of codable tonal components of the current frequency area; or obtaining seventh information about a quantity-screened candidate tonal component of the current frequency area based on the fifth information and the sixth information, and obtaining the third information based on the seventh information.

14. The method of claim 13, wherein obtaining the third information based on the fifth information and the sixth information comprises:

arranging combination-processed candidate tonal components of the current frequency area based on third energy information or third amplitude information of the combination-processed candidate tonal components to obtain eighth information about the candidate tonal components arranged based on the third energy information or the third amplitude information; and obtaining the third information based on the sixth information and the eighth information.

15. The method of claim 14, wherein obtaining the seventh information comprises:

arranging the combination-processed candidate tonal components; and obtaining the seventh information based on the sixth information and the eighth information.

16. The method of claim 14, wherein obtaining the third information based on the seventh information comprises:

arranging, based on sixth location information of quantity-screened candidate tonal components of the current frequency area of the current frame, the quantity-screened candidate tonal components in ascending or descending order of locations to obtain location-arranged quantity-screened candidate tonal components of the current frequency area of the current frame;

obtaining, based on the location-arranged quantity-screened candidate tonal components, first subband sequence numbers corresponding to the location-arranged quantity-screened candidate tonal components;

obtaining second subband sequence numbers corresponding to location-arranged quantity-screened candidate tonal components of a second current frequency area of a previous frame of the current frame; and refining seventh location information of a first location-arranged quantity-screened $n^{th}$ candidate tonal component of the current frequency area of the current frame to obtain the third information when the seventh location information and eighth location information of a second location-arranged quantity-screened nth candidate tonal component of the current frequency area of the previous frame meet a preset condition, and a first subband sequence number corresponding to the first location-arranged quantity-screened $n^{th}$ candidate tonal component is different from a second subband sequence number corresponding to the second location-arranged quantity-screened $n^{th}$ candidate tonal component, wherein the preset condition comprises that a difference between the seventh location information and the eighth location information is less than or equal to a preset threshold.

17. The method of claim 16, wherein refining the seventh location information comprises refining the seventh location information to the eighth location information.

18. An audio coding apparatus comprising:

a memory configured to store instructions; and a processor coupled to the memory and configured to:

obtain a current frame of an audio signal, wherein the current frame comprises a first high frequency band signal;

code the first high frequency band signal to obtain a first coding parameter of the current frame, wherein coding comprises tonal component screening, wherein the coding parameter indicates first information about a target tonal component of the first high frequency band signal, and wherein the first information comprises first location information, first quantity information, and either first amplitude information or first energy information of the tonal component; and perform bitstream multiplexing on the first coding parameter to obtain a coded bitstream.

19. The audio coding apparatus of claim 18, wherein a high frequency band corresponding to the first high frequency band signal comprises a frequency area comprising a current frequency area, and wherein the processor is either further configured to:

obtain second information about a candidate tonal component of the current frequency area based on a second high frequency band signal of the current frequency area;

perform second tonal component screening on the second information to obtain third information about a second target tonal component of the current frequency area; and obtain a second coding parameter of the current frequency area based on the third information; or wherein the processor is further configured to:

perform peak search based on the second high frequency band signal to obtain fourth information about a peak in the current frequency area, wherein the fourth information comprises second quantity information of the peak, second location information of the peak, and second energy information of the peak or second amplitude information of the peak;

perform peak screening on the fourth information to obtain the second information;

perform tonal component screening on the second information to obtain the third information; and obtain the second coding parameter based on the third information about the second target tonal component of the current frequency area.

20. The audio coding apparatus of claim 19, wherein the processor is further configured to perform combination processing on candidate tonal components with a same subband sequence number in the current frequency area to obtain the third information, or wherein the processor is further configured to:

obtain, based on third location information of candidate tonal components of the current frequency area of the current frame, subband sequence numbers corresponding to the candidate tonal components;

obtain first subband sequence numbers corresponding to candidate tonal components of a second current frequency area of a previous frame of the current frame; and refine fourth location information of a first nth candidate tonal component of the current frequency area of the current frame to obtain the third information when the fourth location information and fifth location information of a second nth candidate tonal component of the current frequency area of the previous frame meet a preset condition, and a first subband sequence number corresponding to the first nth candidate tonal component is different from a second subband sequence number corresponding to the second nth candidate tonal component.

21. The audio coding apparatus of claim 19, wherein the current frequency area comprises a subband, and wherein the processor is further configured to:

perform combination processing on candidate tonal components with a same subband sequence number in the current frequency area to obtain fifth information about a combination-processed candidate tonal component of the current frequency area; and obtain the third information based on the fifth information.

22. The audio coding apparatus of claim 21, wherein the subband comprises a current subband, wherein the fifth information comprises third location information of a second combination-processed candidate tonal component of the current subband and comprises third amplitude information or third energy information of the second combination-processed candidate tonal component, wherein the third location information comprises fourth location information of one candidate tonal component in second candidate tonal components of the current subband that do not undergo combination processing, and wherein:

the third amplitude information or the third energy information comprises fourth amplitude information or fourth energy information of the candidate tonal component, or the third amplitude information or the third energy information is based on fifth amplitude information or fifth energy information of the candidate tonal components of the current subband that do not undergo combination processing.

23. The audio coding apparatus of claim 22, wherein the fifth information further comprises quantity information of the combination-processed candidate tonal component, and wherein the quantity information is the same as sixth information about a quantity of subbands having the candidate tonal component in the current frequency area.

24. The audio coding apparatus of claim 21, wherein the processor is further configured to:

arrange, based on third location information of candidate tonal components of the current frequency area, the candidate tonal components in ascending or descending order of locations to obtain location-arranged candidate tonal components of the current frequency area; and perform combination processing on the candidate tonal components with the same subband sequence number in the current frequency area based on the location-arranged candidate tonal components.

25. The audio coding apparatus of claim 21, wherein the processor is further configured to:

obtain the third information based on the fifth information and sixth information about a maximum quantity of codable tonal components of the current frequency area; or obtain seventh information about a quantity-screened candidate tonal component of the current frequency area based on the fifth information and the sixth information, and obtain the third information based on the seventh information.

26. The audio coding apparatus of claim 25, wherein the processor is further configured to:

arrange combination-processed candidate tonal components of the current frequency area based on third energy information or third amplitude information of the combination-processed candidate tonal components of the current frequency area to obtain eighth information about the candidate tonal components arranged based on the third energy information or the third amplitude information; and obtain the third information based on the sixth information and the eighth information.

27. The audio coding apparatus of claim 26, wherein the processor is further configured to:

arrange the combination-processed candidate tonal components; and obtain the seventh information based on the sixth information and the eighth information.

28. The audio coding apparatus of claim 26, wherein the processor is further configured to:

arrange, based on fourth location information of quantity-screened candidate tonal components of the current frequency area of the current frame, the quantity-screened candidate tonal components in ascending or descending order of locations to obtain location-arranged quantity-screened candidate tonal components of the current frequency area of the current frame;

obtain, based on the location-arranged quantity-screened candidate tonal components, subband sequence numbers corresponding to the location-arranged quantity-screened candidate tonal components;

obtain second subband sequence numbers corresponding to location-arranged quantity-screened candidate tonal components of a second current frequency area of a previous frame of the current frame; and refine fifth location information of a first location-arranged quantity-screened nth candidate tonal component of the current frequency area of the current frame to obtain the third information when the fifth location information and sixth location information of a second location-arranged quantity-screened nth candidate tonal component of the current frequency area of the previous frame meet a preset condition, and a first subband sequence number corresponding to the first location-arranged quantity-screened nth candidate tonal component is different from a second subband sequence number corresponding to the second location-arranged quantity-screened nth candidate tonal component, wherein the preset condition comprises that a difference between the fifth location information and the sixth location information is less than or equal to a preset threshold.

29. The audio coding apparatus of claim 28, wherein the processor is further configured to refine the fifth location information to the sixth location information.

30. A computer program product comprising computer-executable instructions stored on a non-transitory computer-readable storage medium that, when executed by a processor, cause an audio coding apparatus to:

obtain a current frame of an audio signal, wherein the current frame comprises a high frequency band signal;

code the high frequency band signal to obtain a coding parameter of the current frame, wherein coding comprises tonal component screening, wherein the coding parameter indicates information about a target tonal component of the high frequency band signal, and wherein the information comprises location information, quantity information, and either amplitude information or energy information of the tonal component; and perform bitstream multiplexing on the coding parameter to obtain a coded bitstream.

* * * * *